(12) United States Patent
Ianev et al.

(10) Patent No.: US 12,185,234 B2
(45) Date of Patent: Dec. 31, 2024

(54) INCOMPATIBLE NETWORK SLICES SUPPORT AND MANAGEMENT

(71) Applicant: NEC Corporation, Tokyo (JP)

(72) Inventors: Iskren Ianev, Tokyo (JP); Toshiyuki Tamura, Tokyo (JP); Hassan Al-Kanani, Tokyo (JP); Linghang Fan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 410 days.

(21) Appl. No.: 17/629,998

(22) PCT Filed: Apr. 26, 2021

(86) PCT No.: PCT/JP2021/016690
§ 371 (c)(1),
(2) Date: Jan. 25, 2022

(87) PCT Pub. No.: WO2021/225088
PCT Pub. Date: Nov. 11, 2021

(65) Prior Publication Data
US 2022/0256451 A1    Aug. 11, 2022

(30) Foreign Application Priority Data

May 7, 2020    (EP) .................................. 20173543

(51) Int. Cl.
*H04W 48/18*    (2009.01)
*H04W 48/02*    (2009.01)
*H04W 60/04*    (2009.01)

(52) U.S. Cl.
CPC .......... *H04W 48/18* (2013.01); *H04W 48/02* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 11,843,966 B2 * | 12/2023 | Prabhakar | H04W 76/16 |
| 2019/0007500 A1 * | 1/2019 | Kim | H04L 67/141 |
| 2019/0182875 A1 * | 6/2019 | Talebi Fard | H04W 76/11 |
| 2019/0357130 A1 * | 11/2019 | Garcia Azorero | H04W 12/06 |
| 2020/0008139 A1 * | 1/2020 | Lai | H04W 48/16 |
| 2020/0107250 A1 | 4/2020 | So | |

(Continued)

FOREIGN PATENT DOCUMENTS

EP        3557913 A1    10/2019

OTHER PUBLICATIONS

International Search Report for PCT Application No. PCT/JP2021/016690, mailed on Jul. 5, 2021.

(Continued)

*Primary Examiner* — Alpus Hsu
*Assistant Examiner* — Camquyen Thai
(74) *Attorney, Agent, or Firm* — Sughrue Mion, PLLC

(57) ABSTRACT

The disclosure is addressing the 3GPP and GSMA requirements for compatibility restrictions between certain network slices. It proposes solutions for management, control and enforcement of the constraints for simultaneous usage of certain network slices in the UE (3) and in the network. This allows for different level of isolation between the network slices leading to improved security and integrity in the data exchange.

12 Claims, 19 Drawing Sheets

(56) References Cited

U.S. PATENT DOCUMENTS

2020/0120738 A1* 4/2020 Kawasaki ............. H04W 76/18
2020/0359224 A1* 11/2020 Gibson ................. H04W 16/02

OTHER PUBLICATIONS

3GPP TR 21.905 V15.0.0 (Mar. 2018), "Vocabulary for 3GPP Specifications", pp. 1-66.
3GPP TR 23.501 V16.1.0 (Jun. 2019), "System Architecture for the 5G System; Stage 2", pp. 1-387.
3GPP TS 23.501 V16.4.0 (Mar. 2020), "Procedures for the 5G System; Stage 2", pp. 1-582.
GSM Association, Official Document NG. 116, Generic Network Slice Template. Version 2.0, Oct. 16, 2019, pp. 1-61.
3GPP TR 23.700-40 V0.3.0 (Jan. 2020), "Study on Enhancement of Network Slicing, Phase 2", pp. 1-62.
S2-173103-23.501, Qualcomm Incorporated et al: "TS 23.501: Slice co-existence and conflicting S-NSSAIs". 3GPP DRAFT, May 9, 2017, pp. 1-8.
3GPP TS 23.501 V16.4.0 (Mar. 2020), "Technical Specification Group Services and System Aspects; System architecture for the 5G System (5GS); Stage 2 (Release 16)", pp. 1-430.
Indian Office Action for IN Application No. 202247062814, mailed on Jan. 10, 2023 with English Translation.
JP Office Action for JP Application No. 2023-068118, mailed on Apr. 9, 2024 with English Translation.
Nokia, Nokia Shanghai Bell, Telecom Italia, "way forward for KI#1", 3GPP TSG SA WG2 #129bis S2-1813207, Nov. 30, 2018, p. 1-p. 4.

* cited by examiner

INCOMPATIBLE NETWORK SLICES SUPPORT AND MANAGEMENT

This application is a National Stage Entry of PCT/JP2021/016690 filed on Apr. 26, 2021, which claims priority from European Patent Application 20173543.8 filed on May 7, 2020, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to network slice quota management in the so-called '5G' (or 'Next Generation') systems.

Abbreviations

3GPP: 3rd Generation Partnership Project
5G: 5th Generation
5GC: 5G Core Network
5GS: 5G System
5G-AN: 5G Access Network
AF: Application Function
AMF: Access and Mobility Management Function
AS: Application Server
AUSF: Authentication Server Function
BSS: Business Support System
CST: Generic Network Slice Template
GSMA: Global System for Mobile Communications
gNB: Next generation Node B
GST: Generic Slice Template
MM: Mobility Management
MNO: Mobile Network Operator
NAS: Non-Access Stratum
NEF: Network Expose Function
NF: Network Function
NG-RAN: Next Generation Radio Access Network
NR: New Radio
NSSAI Network Slice Selection Assistance Information
OAM: Operations and Maintenance
OSS: Operations Support System
PCC: Policy and Charging Control
PCF: Policy Control Function
PDU: Protocol Data Unit
PLMN: Public land mobile network
(R)AN: (Radio) Access Network
RRC: Radio Resource Control
S-NSSAI: Single Network Slice Selection Assistance Information
SD: Service Discriminator
SLA: Service Level Agreement
SMF: Session Management Function
SST: Slice Service Type
UDM: Unified Data Management
UDR: Unified Data Repository
UE: User Equipment

Definitions

For the purposes of the present document, the terms and definitions given in 3GPP Technical Report (TR) 21.905 [NPL1] and the following apply. A term defined in the present document takes precedence over the definition of the same term, if any, in 3GPP TR 21.905 [NPL1].

BACKGROUND ART

Network slicing features defined in 3GPP release 15 and release 16 enable a great variety of communication services for operators and verticals alike. To enhance the commercial viability of Network Slicing, GSMA 5GJA has introduced in document NG.116 the concept of Generic Slice Template [NPL4] from which several Network Slice Types descriptions can be derived. Some of the parameters in the GST point explicitly to the definition of parameters and bounds on the service delivered to the end customer. However, the enforcement of some of these bounds and these parameters are not supported by the 5GS yet.

The SA2 Study on Enhancement of Network Slicing Phase 2 aims at identifying the gaps that need to be filled in providing support for the GST parameters enforcement and the suitable solution to address these gaps.

3GPP SA2 working group agreed a new key issue on Constraints on simultaneous use of the network slice, see Key Issue 6 in TR 23.700-40 ver0.3.0 [NPL 5]. One of the attributes in the GST documented in GSMA 5GJA NG.116 [NPL 3] is the following: Simultaneous use of the network slice. This attribute describes whether a network slice can be simultaneously used.

This key issue will study:

1) How to enforce the constraints related to simultaneous usage of Network Slices in the UE and in the network, both in roaming and non-roaming scenarios.

2) How to ensure that the identified enforcement solution does not negatively impact the network operations of Rel-15 and Rel-16 5GS deployments

CITATION LIST

Non Patent Literature

NPL 1: 3GPP TR 21.905: "Vocabulary for 3GPP Specifications". V15.0.0 (2018-03)
NPL 2: 3GPP TS 23.501: "System Architecture for the 5G System; Stage 2". V16.1.0 (2019-06)—http://www.3gpp.org/ftp/Specs/archive/23_series/23.501/23501-g40.zip
NPL 3: 3GPP TS 23.502: "Procedures for the 5G System; Stage 2" V16.140 (2019-06)—http://www.3gpp.org/ftp/Specs/archive/23_series/23.502/23502-g40.zip
NPL 4: Generic Network Slice Template https://www.gsma.com/newsroom/wp-content/uploads/NG.116-v2.0.pdf
NPL 5: SA2 SID on Enhancement of Network Slicing Phase 2.—http://www.3gpp.org/ftp/tsg_sa/WG2_Arch/Latest_SA2_Specs/Latest_draft_S2_Specs/23700-40-030.zip

SUMMARY OF INVENTION

Technical Problem

Problem: Based on the GST document GSMA 5GJA NG.116 [NPL 4] requirements for Simultaneous use of the network slice (key Issue 6 of the eNS_ph2 study in TR23.700-40 [NPL 5]), the following problem shall be solved in 3GPP normative specs for Rel-17:

1) How to restrict simultaneous use of network slices if they have:
   a) different SST or;
   b) different SD or;
   c) cannot be used simultaneously with any other network slice.
2) How to ensure that the identified enforcement solution does not negatively impact the network operations of Rel-15 and Rel-16 5GS deployments.

Currently there are no available solutions for controlling the network slice simultaneous use in the mobile networks. Without a restriction control for network slice simulations use it is impossible to guarantee the network slice isolation required for improved 5G data security and integrity in the 3GPP mobile networks. Clearly, there is a need for network slice simultaneous use control and management in the 3GPP mobile networks in order to achieve higher security for the sensitive data and applications by offering them different levels of isolation between the network slices these sensitive data and applications are running on.

Solution to Problem

In a first aspect, there is provided a user equipment (UE), comprising:
   means for determining whether a new Protocol Data Unit (PDU) session is compatible or incompatible with an established PDU session based on all of:
   a) at least one of a value of a first Slice Service Type (SST) of a first Single-Network Slice Selection Assistance Information (S-NSSAI) for the established PDU session on the UE and a value of a first Service Descriptor (SD) of the first S-NSSAI for the established PDU session on the UE,
   b) a first incompatibility attribute value for indicating restriction of at least one of the value of the first SST and the value of the first SD for simultaneous use of the new PDU session and the established PDU session,
   c) at least one of a value of a second SST of a second S-NSSAI for the new PDU session and a value of a second SD of the second S-NSSAI, and
   d) a second incompatibility attribute value for indicating restriction of at least one of the value of the second SST and the value of the second SD for simultaneous use of the new PDU session and the established PDU session.

In a second aspect, there is provided a core network node for mobility management, comprising:
   means for receiving, from a user equipment (UE), a message for using a new Protocol Data Unit (PDU) session, the message including a second Single-Network Slice Selection Assistance Information (S-NSSAI) for the new PDU session on the UE and a second incompatibility attribute value for indicating restriction of at least one of a value of a second Slice Service Type (SST) of the second S-NSSAI and a value of a second Service Descriptor (SD) of the second S-NSSAI for simultaneous use of the new PDU session and an established PDU session; and
   means for determining whether the new PDU session is compatible or incompatible with the established PDU session based on all of:
   a) at least one of a value of a first SST of a first S-NSSAI for the established PDU session on the UE and a value of a first SD of the first S-NSSAI,
   b) a first incompatibility attribute value for indicating restriction of at least one of the value of the first SST and the value of the first SD for simultaneous use of the new PDU session and the established PDU session,
   c) at least one of the value of the second SST and the value of the second SD, and
   d) the second incompatibility attribute value for indicating restriction of the at least one of the value of the second SST and the value of the second SD for simultaneous use of the new PDU session and the established PDU session.

In a third aspect, there is provided a controlling method for a user equipment (UE), the controlling method comprising:
   determining whether a new Protocol Data Unit (PDU) session is compatible or incompatible with an established PDU session based on all of:
   a) at least one of a value of a first Slice Service Type (SST) of a first Single-Network Slice Selection Assistance Information (S-NSSAI) for the established PDU session on the UE and a value of a first Service Descriptor (SD) of the first S-NSSAI for the established PDU session on the UE,
   b) a first incompatibility attribute value for indicating restriction of at least one of the value of the first SST and the value of the first SD for simultaneous use of the new PDU session and the established PDU session,
   c) at least one of a value of a second SST of a second S-NSSAI for the new PDU session and a value of a second SD of the second S-NSSAI, and
   d) a second incompatibility attribute value for indicating restriction of at least one of the value of the second SST and the value of the second SD for simultaneous use of the new PDU session and the established PDU session.

In a fourth aspect, there is provided a controlling method for a core network node for mobility management, the controlling method comprising:
   receiving, from a user equipment (UE), a message for using a new Protocol Data Unit (PDU) session, the message including a second Single-Network Slice Selection Assistance Information (S-NSSAI) for the new PDU session on the UE and a second incompatibility attribute value for indicating restriction of at least one of a value of a second Slice Service Type (SST) of the second S-NSSAI and a value of a second Service Descriptor (SD) of the second S-NSSAI for simultaneous use of the new PDU session and an established PDU session; and
   determining whether the new PDU session is compatible or incompatible with the established PDU session based on all of:
   a) at least one of a value of a first SST of a first S-NSSAI for the established PDU session on the UE and a value of a first SD of the first S-NSSAI,
   b) a first incompatibility attribute value for indicating restriction of at least one of the value of the first SST and the value of the first SD for simultaneous use of the new PDU session and the established PDU session,
   c) at least one of the value of the second SST and the value of the second SD, and
   d) the second incompatibility attribute value for indicating restriction of the at least one of the value of the second SST and the value of the second SD for simultaneous use of the new PDU session and the established PDU session.

Advantageous Effects of Invention

According to the present disclosure, it is possible to provide a method and an apparatus for estimating an appearance of a first target.

BRIEF DESCRIPTION OF DRAWINGS

Embodiments of the invention will be better understood and readily apparent to one of ordinary skill in the art from the following written description, by way of example only, and in conjunction with the drawings, in which.

DESCRIPTION OF EMBODIMENTS

<Solution 1—Incompatible Network Slices Support—UE Based Solution>

<Aspect 1: UE based solution>—In the UE based solution, the UE 3 is responsible for the network slices simultaneous usage restrictions enforcement.

Figure 1:
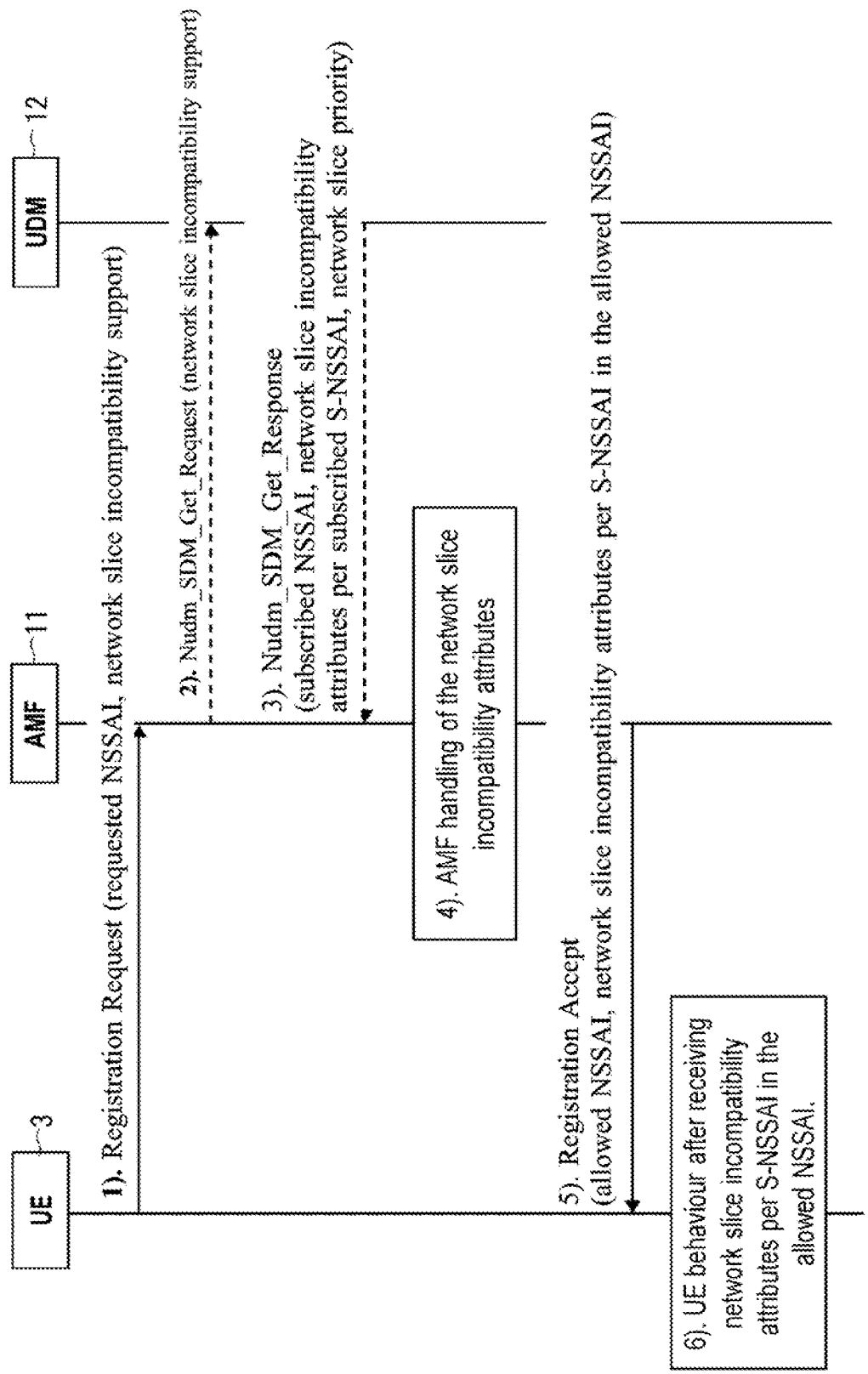
FIG. 1 is a timing (signalling) diagram illustrating schematically an exemplary method for providing support for incompatible network slices in accordance with a UE based solution.

FIG. 1 is a timing (signalling) diagram illustrating schematically an exemplary method for providing support for incompatible network slices in accordance with a UE based solution.

1) Registration Request (requested NSSAI, network slice incompatibility support)—The UE 3 requests registration with the network and if the UE 3 supports the network slices simultaneous usage incompatibility feature, the UE 3 also includes in the Registrations Request message (or in any other NAS message) an indication 'network slice incompatibility support' (or any other notation for a parameter to indicate the UE capability for network slices simultaneous usage incompatibility support) to indicate to the network its support for network slices simultaneous usage incompatibility feature.

2) Nudm_SDM_Get_Request (network slice incompatibility support)—If the AMF 11 also supports the network slice simultaneous usage incompatibility feature, the AMF 11 passes the 'network slice incompatibility support' indication to the UDM 12 when retrieving UE's subscription information.

3) Nudm_SDM_Get_Response (subscribed NSSAI, network slice incompatibility attributes per subscribed S-NSSAI, network slice priority)—In return, the UDM 12 along with the list of subscribed S-NSSAI for the UE 3, the UDM 12 also returns the 'network slice incompatibility attributes per subscribed S-NSSAI' which defines the network slice incompatibility attribute per each subscribed network slice, e.g.:

0—the network slice can be used simultaneously with any network slice;

1—the network slice can be used simultaneously with any network slice with same SST value;

2—the network slice can be used simultaneously with any network slice with same SD value;

3—the network slice cannot be used simultaneously with another network slice.

In case that the network slice incompatibility support indication is not present in the Nudm_SDM_Get_Request message from the AMF 11, i.e. meaning the AMF 11 may be compliant with Rel-16 or earlier, the UDM 12 constructs a list of subscribed S-NSSAIs that is only composed of compatible S-NSSAI(s).

In case the UDM 12 maintains a priority order among subscribed S-NSSAIs for the UE 3, the list of subscribed S-NSSAIs could be constructed taking the priority into account. The UDM 12 may include a network slice priority order information in the Nudm_SDM_Get_Response message. The network slice priority order information in the UDM 12 indicates a priority for S-NSSAI(s) within the subscribed NSSAI that the UE 3 subscribes to. This information may help the AMF 11 for constructing an allowed NSSAI in case the AMF 11 needs to choose a set of S-NSSAI(s) for the allowed NSSAI while different combinations of S-NSSAI(s) for allowed NSSAI are available.

4) AMF handling of the network slice incompatibility attributes—The AMF 11 stores the list of the network slices the UE 3 is subscribed to along with their network slice incompatibility attributes in the UE context within the AMF 11 so that this information can be available in the AMF 11 for the duration of the UE registration with that AMF 11. The AMF 11 also maps the network slice incompatibility attributes per subscribed S-NSSAI to network slice incompatibility attributes per S-NSSAI in the allowed NSSAI (or per allowed S-NSSAI).

5) Registration Accept (allowed NSSAI, network slice incompatibility attributes per S-NSSAI in the allowed NSSAI)—When confirming the UE registration procedure, along with the list of allowed network slices for the UE 3 (i.e. allowed NSSAI), the AMF 11 also includes the 'network slice incompatibility attributes per S-NSSAI in the allowed NSSAI' parameter or information element which defines the network slice incompatibility attribute per each allowed network slice for the UE 3, e.g.:
  0—the network slice can be used simultaneously with any network slice;
  1—the network slice can be used simultaneously with any network slice with same SST value;
  2—the network slice can be used simultaneously with any network slice with same SD value;
  3—the network slice cannot be used simultaneously with another network slice.

In case that the AMF 11 rejects a requested S-NSSAI due to incompatibility with other requested S-NSSAI(s), the AMF 11 may also include the 'network slice incompatibility attributes per rejected S-NSSAI' parameter or information element which defines the network slice incompatibility attribute per each rejected network slice for the UE 3.

6). The UE behaviour after receiving network slice incompatibility attributes per S-NSSAI in the allowed NSSAI—The UE 3 shall not allow for simultaneous PDU sessions on incompatible network slices in a case that the UE 3 has already established a PDU Session(s) and is going to establish one or more new PDU Sessions or the UE 3 is going to activate one or more PDU Sessions that have already been established but are not active. There are two alternatives in the UE behaviour to restrict the simultaneous use of the incompatible network slices.

Alternative A:

Network slice simultaneous use incompatibility is per established PDU Sessions. Simultaneous PDU Sessions on different network slices can be restricted subject to the network slices incompatibility attributes of these network slices. It means that the UE 3 shall not establish a new PDU Session on a new network slice if:
  (the new network slice is incompatible with any other network slice on which a PDU Session has already been established) OR
  (any network slice on which a PDU Session has already been established is incompatible with the new network slice on which the UE 3 wants to establish a new PDU Session).

Figure 2:
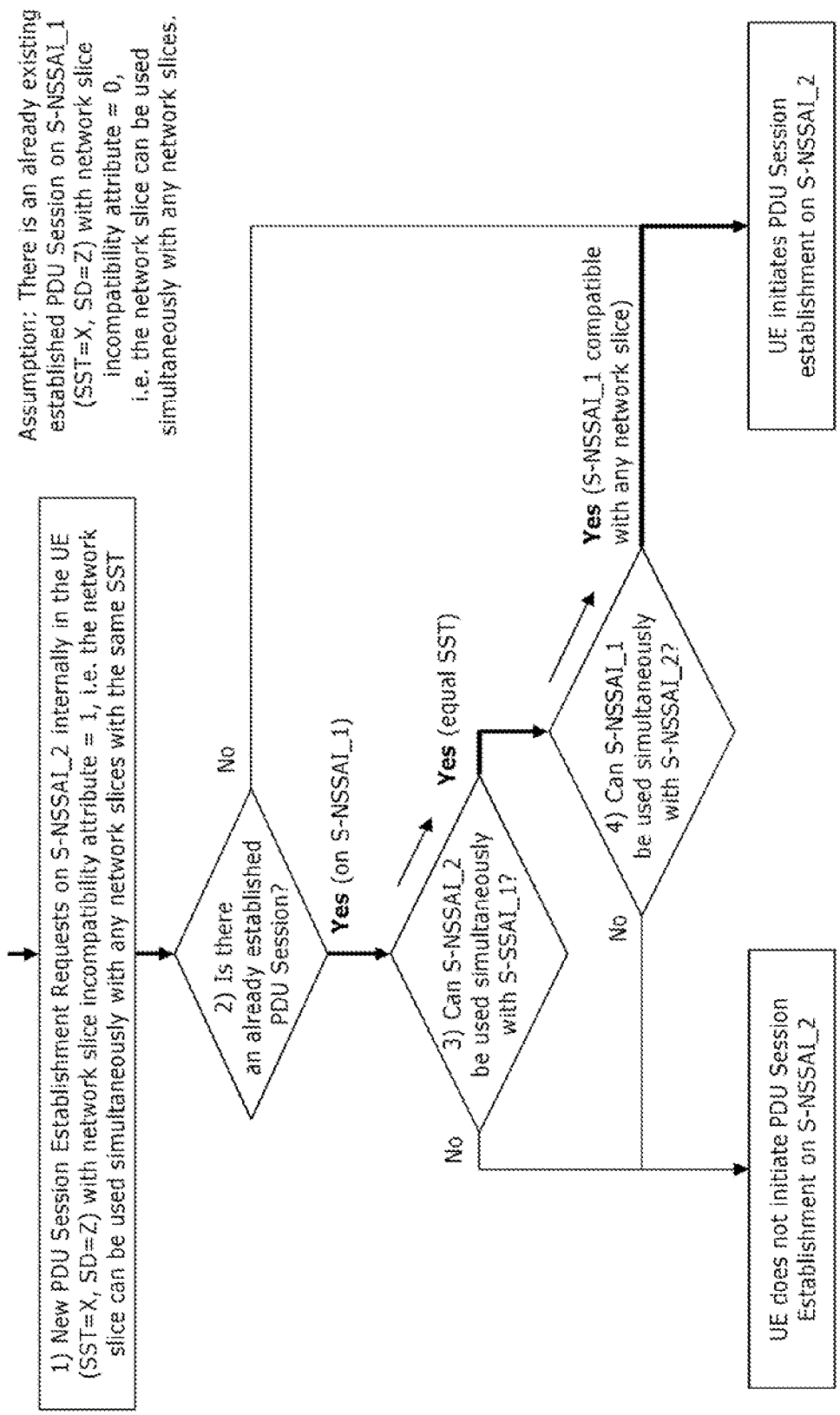
FIG. 2 is a flow chart illustrating an example of the UE behaviour for Alternative A, based on the UE based solution shown in FIG. 1.

FIG. 2 is a flow chart illustrating an example of the UE behaviour for Alternative A, based on the UE based solution shown in FIG. 1.

In this example in FIG. 2, as an assumption, the UE 3 has already establish a PDU session on an S-NSSAI_1 (SST="X", SD="Z") with a network slice incompatibility attribute=0, i.e. the network slice can be used simultaneously with any network slices. The process starts from step 1).

1). The UE 3 is requested internally to establish a new PDU session by receiving a new PDU Session Establishment Request on an S-NSSAI_2 (SST="X", SD="Z") with a network slice incompatibility attribute=1, i.e. the network slice can be used simultaneously with any network slices with the same SST.

2). The UE 3 determines whether there is an already established PDU session on a network slice different than the S-NSSAI_2. If the UE 3 determines that there is no established PDU session, then the UE 3 initiates a PDU session establishment procedure on the S-NSSAI_2. Otherwise, if the UE 3 determines that there is an already established PDU session, then the process proceeds to the next step 3).

In this example, since there is an already established PDU session, the process proceeds to the next step 3).

3). Check for S-NSSAI_2 simultaneous use incompatibility with S-NSSAI_1. The UE 3 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the UE 3 determines that the S-NSSAI_2 can be used simultaneously with the S-NSSAI_1, then the procedure proceeds to step 4). Otherwise, if the UE 3 determines that the S-NSSAI_2 cannot be used simultaneously with the S-NSSAI_1, then the UE 3 does not initiate a PDU session establishment procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there were already established PDU sessions on more than one network slices, then the UE 3 shall determine whether the S-NSSAI_2 can be used simultaneously with each of these network slices one by one.

In this example, as there is an already established PDU session only on the S-NSSAI_1 and since the value of the network slice incompatibility attribute of the S-NSSAI_2 is 1, and the value of the SST of the S-NSSAI_2 is same as the value of the SST of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2. The UE 3 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the UE 3 determines that the S-NSSAI_1 can be used simultaneously with the S-NSSAI_2, then the UE 3 initiates a PDU session establishment procedure on the S-NSSAI_2. Otherwise, if the UE 3 determines that the S-NSSAI_1 cannot be used simultaneously with the S-NSSAI_2, then the UE 3 does not initiate a PDU session establishment procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there were already established PDU sessions on more than one network slices, then the UE 3 shall determine whether each one of these network slices can be used simultaneously with the S-NSSAI_2.

In this example, as there is an already established PDU session only on the S-NSSAI_1 and since the value of the network slice incompatibility attribute of the S-NSSAI_1 is 0, so the S-NSSAI_1 can be used simultaneously with the S-NSSAI_2. Thus the UE 3 initiates a PDU session establishment procedure on the S-NSSAI_2.

Alternative B:

Network slice simultaneous use incompatibility is per active PDU sessions. Simultaneous PDU Sessions on different network slices can be restricted subject to the network slices incompatibility attributes of these network slices. It means that the UE 3 shall not establish a new PDU Session or activate an already establish non-active PDU Session on a new network slice if:

(the new network slice is incompatible with any other network slice on which there is an active PDU Session) OR (any network slice on which there is an active PDU Session is incompatible with the new network slice on which the UE 3 wants to establish a new PDU Session or activate an already established but non-active PDU Session).

Figure 3:
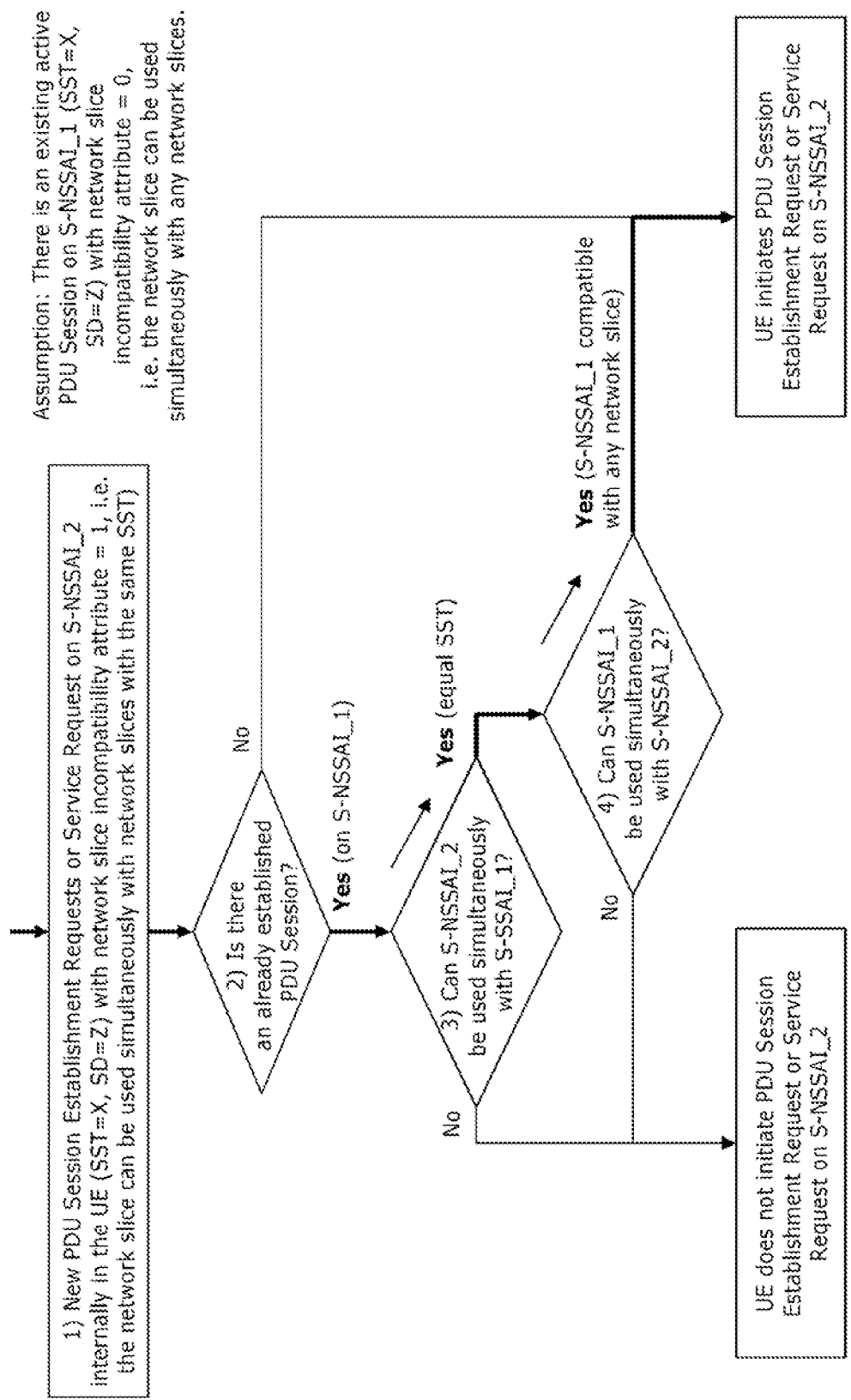
FIG. 3 is a flow chart illustrating an example of the UE behaviour for Alternative B based on the UE based solution shown in FIG. 1.

FIG. 3 is a flow chart illustrating an example of the UE behaviour for Alternative B based on the UE based solution shown in FIG. 1.

In this example in FIG. 3, as an assumption, the UE 3 has an already active PDU session on an S-NSSAI_1 (SST="X", SD="Z") with a network slice incompatibility attribute=0, i.e. the network slice can be used simultaneously with any network slices. The process starts from step 1).

1). The UE is requested internally to establish a new PDU session or service request by receiving a new PDU Session Establishment Request or Service Request on an S-NSSAI_2 (SST="X", SD="Z") with a network slice incompatibility attribute=1, i.e. the network slice can be used simultaneously with any network slices with the same SST.

2). The UE 3 determines whether there is an already active PDU session on a network slice different than the S-NSSAI_2. If the UE 3 determines that there is no active PDU session, then the UE 3 initiates a PDU session establishment procedure or Service Request procedure on the S-NSSAI_2. Otherwise, if the UE 3 determines that there is an already active PDU session on another network slice, then the process proceeds to the next step 3).

In this example, since there is an already active PDU session on another network slice i.e. the S-NSSAI_1, the process proceeds to the next step 3).

3). Check for S-NSSAI_2 simultaneous use incompatibility with S-NSSAI_1—The UE 3 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the UE 3 determines that the S-NSSAI_2 can be used simultaneously with the S-NSSAI_1, then the procedure proceeds to step 4). Otherwise, if the UE 3 determines that the S-NSSAI_2 cannot be used simultaneously with the S-NSSAI_1, then the UE 3 does not initiate a PDU session establishment or Service Request procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there were already active PDU sessions on more than one network slices, then the UE 3 shall determine whether the S-NSSAI_2 can be used simultaneously with each of these network slices one by one.

In this example, as there is an already active PDU session only on the S-NSSAI_1 and since the value of the network slice incompatibility attribute of the S-NSSAI_2 is 1, and the value of the SST of the S-NSSAI_2 is same as the value of the SST of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The UE 3 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the UE 3 determines that the S-NSSAI_1 can be used simultaneously with the S-NSSAI_2, then the UE 3 initiates a PDU session establishment procedure or Service Request on the S-NSSAI_2. Otherwise, if the UE 3 determines that the S-NSSAI_1 cannot be used simultaneously with the S-NS- SAI_2, then the UE 3 does not initiate a PDU session establishment or Service Request procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there were already active PDU sessions on more than one network slices, then the UE 3 shall determine whether each one of these network slices can be used simultaneously with the S-NSSAI_2.

In this example, as there is an already active PDU session only on the S-NSSAI_1 and since the value of the network slice incompatibility attribute of the S-NSSAI_1 is 0, so the S-NSSAI_1 can be used simultaneously with the S-NSSAI_2. Thus the UE 3 initiates a PDU session establishment or Service Request procedure on the S-NSSAI_2.

Note: SD (Service Descriptor) is an optional attribute of the S-NSSAI. When the SD is omitted, the result from the incompatibility check for SD may be standardised or implantation matter (e.g. when the incompatibility is managed in the UE 3 or operator defined (when the network slice incompatibility is managed in the network).

<Solution 2—Incompatible Network Slices Support—Network Based Solution>

In the network based solution, the responsibility for the network slices simultaneous usage restriction enforcement is with the network, i.e. with the AMF 11.

This approach assumes that the UE 3 has been successfully registered to the 5GC and the AMF 11 being associated with the UE 3 maintains the network slice incompatibility attributes per subscribed S-NSSAI in the MM context of the UE 3 as described in Solution 1. The network slice incompatibility attributes per subscribed S-NSSAI can be obtained from the UDM 12 as described in step 2 and step 3 in FIG. 1 for Solution 1 or from the old AMF 11 due to mobility with AMF 11 change. The old AMF 11 sets the network slice incompatibility attributes per subscribed S-NSSAI information as the MM context of UE 3 and transfers to a new AMF 11. The AMF 11 also maps the network slice incompatibility attributes per subscribed S-NSSAI to network slice incompatibility attributes per S-NSSAI in the allowed NSSAI, as described in step 4 in FIG. 1 for Solution 1.

<Aspect 1: Network Based Solution 2—Successful Case>

Figure 4:
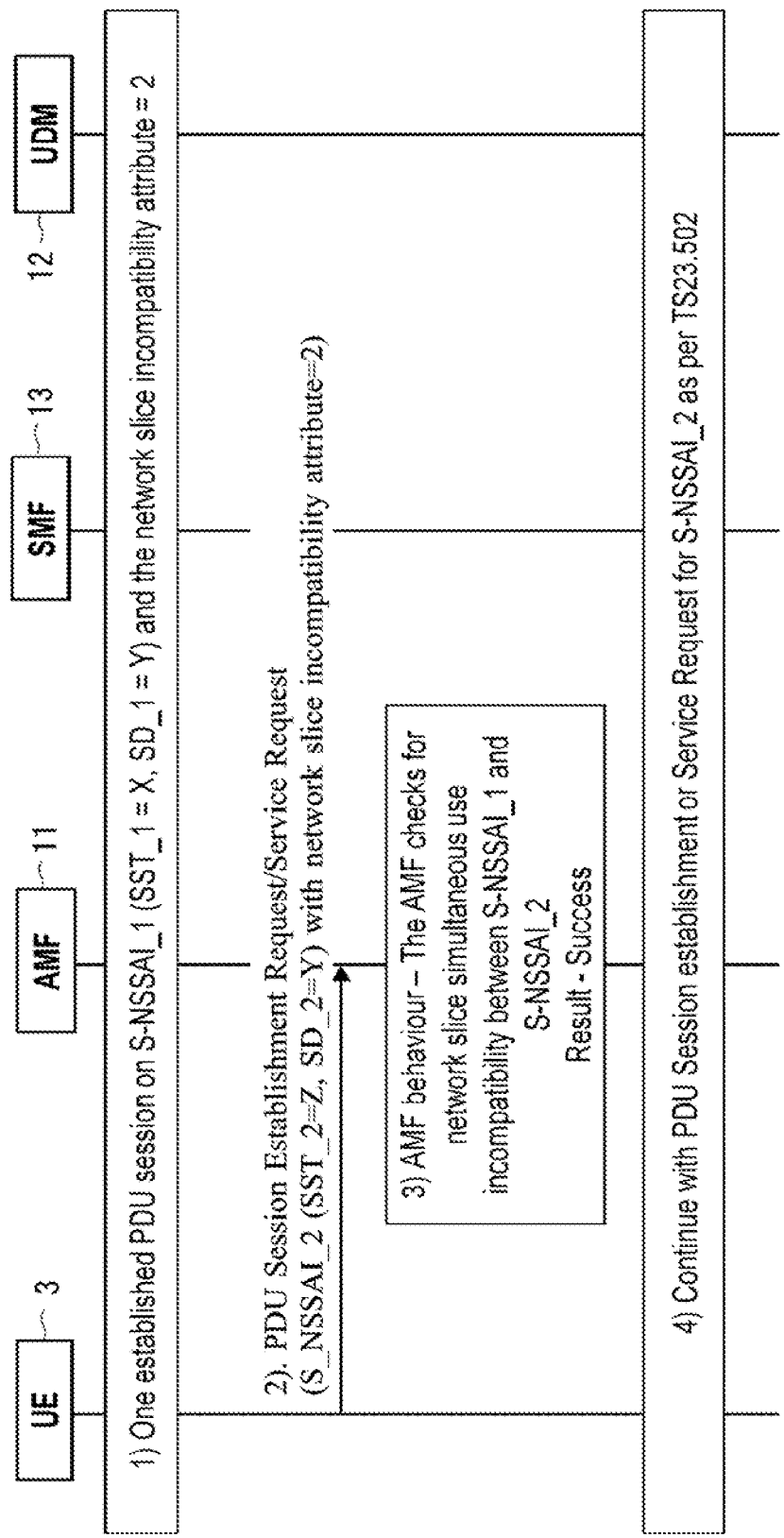
FIG. 4 is a timing (signalling) diagram illustrating schematically an exemplary method for providing support for incompatible network slices with a network based solution where a PDU Session Establishment Request or Service Request on a new network slice is successful.

FIG. 4 is a timing (signalling) diagram illustrating schematically an exemplary method for providing support for incompatible network slices with a network based solution where a PDU Session Establishment Request or Service Request on a new network slice is successful.

1). There is an already established PDU Session on an S-NSSAI_1 (SST_1=X, SD_1=Y) with a network slice incompatibility attribute=2, i.e. the network slice can be used simultaneously with any network slices with the same SD.

2). The UE 3 triggers a new PDU Session Establishment Request or a Service Request over an already established PDU Session on an S-NSSAI_2 (SST_2=Z, SD_2=Y) with a network slice incompatibility attribute=2, i.e. the network slice can be used simultaneously with any network slices with the same SD.

3). AMF behaviour—The AMF 11 checks for network slice simultaneous use incompatibility of between the S-NSSAI_1 and the S-NSSAI_2 in order to decide whether to allow or reject the PDU Session establishment or Service Request on the S-NSSAI_2. The AMF 11 already holds in the UE context the incompatibility attributes for each of the S-NSSAIs in the allowed NSSAI of the UE 3, acquired during the UE registration. There are two alternatives:

Alternative A:

Network slice simultaneous use incompatibility is per established PDU sessions. Simultaneous PDU Sessions on different network slices can be restricted subject to the network slices incompatibility attributes of these network slices. It means that the AMF 11 shall not allow a new PDU Session on a new network slice if:
- (the new network slice is incompatible with any other network slice on which a PDU Session has already been established) OR
- (any network slice on which a PDU Session has already been established is incompatible with the new network slice on which the UE 3 wants to establish a new PDU Session).

Figure 5:
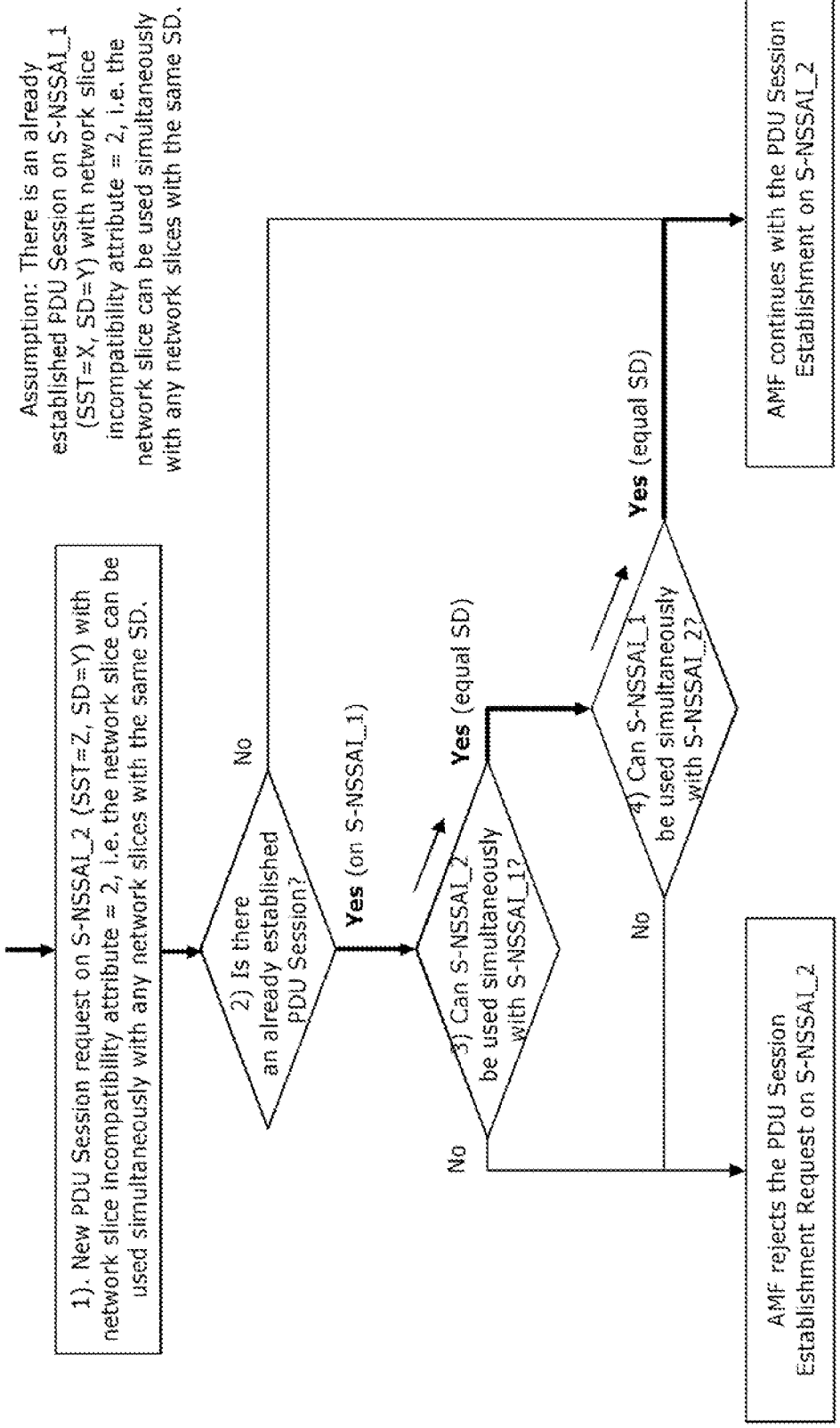
FIG. 5 is a flowchart illustrating an example of the AMF behaviour for Alternative A (solution 2, successful case)

FIG. 5 is a flowchart illustrating an example of the AMF behaviour for Alternative A (solution 2, successful case).

In this example in FIG. 5, as an assumption, there is an already established PDU session on an S-NSSAI_1 (SST="X", SD="Y") with a network slice incompatibility attribute=2, i.e. the network slice can be used simultaneously with any network slices with the same SD. The process starts from step 1).

1). The AMF 11 receives a new PDU Session Establishment Request on an S-NSSAI_2 (SST="Z", SD="Y") with a network slice incompatibility attribute=2, i.e. the network slice can be used simultaneously with any network slices with the same SD.

2). The AMF 11 determines whether there is an already established PDU session on a network slice different than the S-NSSAI_2. If the AMF 11 determines that there is no established PDU session, then the AMF 11 continues with the PDU session establishment procedure on the S-NSSAI_2. Otherwise, if the AMF 11 determines that there is an already established PDU session on a network slice different than the S-NSSAI_2, then the process proceeds to the next step 3).

In this example, since there is an already established PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already established PDU sessions on more than one network slices, then the AMF 11 shall determine whether the S-NSSAI_2 can be used simultaneously with each of these network slices one by one.

In this example, as there is an already established PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the 5-NSSAI_1 and the S-NSSAI_2. If the AMF 11 determines that the S-NSSAI_1 can be used simultaneously with the S-NSSAI_2, then the AMF 11 continues with the PDU session establishment procedure on the S-NSSAI_2. Otherwise, if the AMF 11 determines that the S-NSSAI_1 cannot be used simultaneously with the S-NSSAI_2, then the AMF 11 rejects the PDU session establishment procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already established PDU sessions on more than one network slices, then the AMF 11 shall determine whether each one of these network slices can be used simultaneously with the S-NSSAI_2.

In this example, as there is an already established PDU session only on the S-NSSAI_1 and since the value of the network slice incompatibility attribute of the S-NSSAI_1 is 2, and the value of the SD of the S-NSSAI_1 is same as the value of the SD of the S-NSSAI_2, so the S-NSSAI_1 can be used simultaneously with the S-NSSAI_2. Thus the AMF 11 continues with the PDU session establishment procedure on the S-NSSAI_2.

Alternative B:

Network slice simultaneous use incompatibility is per active PDU sessions. Simultaneous PDU Sessions on different network slices can be restricted subject to the network slices incompatibility attributes of these network slices. It means that the AMF 11 shall not allow for a new PDU Session Establishment or Service Request on a new network slice if:

(the new network slice is incompatible with any other network slice on which there is an active PDU Session) OR (any network slice on which there is an active PDU Session is incompatible with the new network slice on which the UE 3 wants to establish a new PDU Session or activate an already established but non-active PDU Session).

Figure 6:
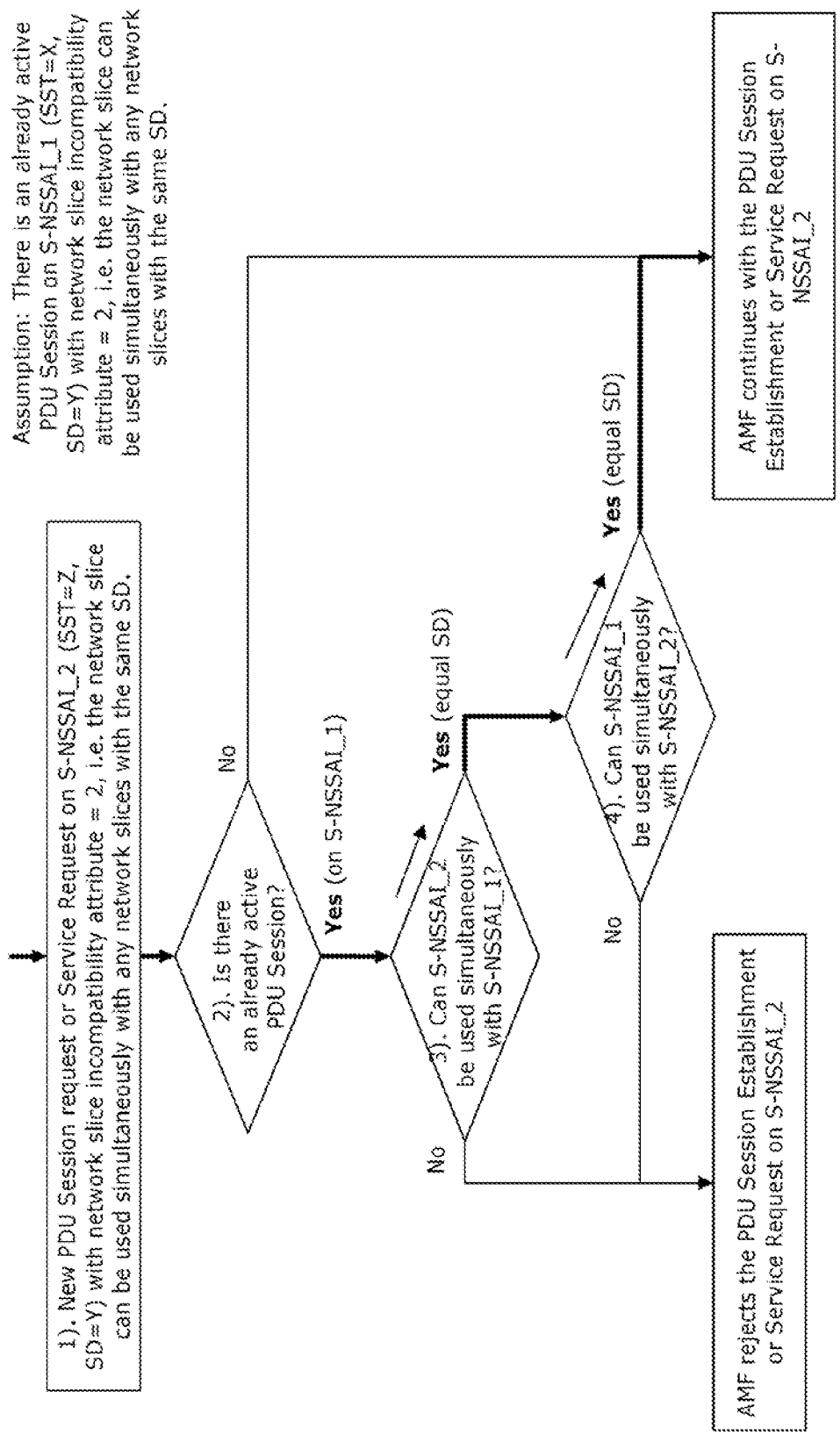
FIG. 6 is a flowchart illustrating an example of the AMF behaviour for Alternative B (solution 2, successful case)

FIG. 6 is a flowchart illustrating an example of the AMF behaviour for Alternative B (solution 2, successful case).

In this example in FIG. 6, as an assumption, there is an already active PDU session on an S-NSSAI_1 (SST="X", SD="Y") with a network slice incompatibility attribute=2, i.e. the network slice can be used simultaneously with any network slices with the same SD. The process starts from step 1).

1). AMF 11 receives a new PDU Session Establishment Request or Service Request on an S-NSSAI_2 (SST="Z", SD="Y") with a network slice incompatibility attribute=2, i.e. the network slice can be used simultaneously with any network slices with the same SD.

2). The AMF 11 determines whether there is an already active PDU session on a network slice different than the S-NSSAI_2. If the AMF 11 determines that there is no active PDU session, then the AMF 11 continues with the PDU session establishment procedure or Service Request procedure on the S-NSSAI_2. Otherwise, if the AMF 11 determines that there is an already active PDU session on a network slice different than the S-NSSAI_2, then the process proceeds to the next step 3).

In this example, since there is an already active PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment procedure or the Service Request procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already active PDU sessions on more than one network slices, then the AMF 11 shall determine whether the S-NSSAI_2 can be used simultaneously with each of these network slices one by one.

In this example, as there is an already active PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure or Service Request procedure on the S-NSSAI_2. Otherwise, if the AMF 11 determines that the S-NSSAI_1 cannot be used simultaneously with the S-NSSAI_2, then the AMF 11 rejects the PDU session establishment procedure or Service Request procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already active PDU sessions on more than one network slices, then the AMF 11 shall determine whether each one of these network slices can be used simultaneously with the S-NSSAI_2.

In this example, as there is an already active PDU session only on the S-NSSAI_1 and since the value of the network slice incompatibility attribute of the S-NSSAI_1 is 2, and the value of the SD of the S-NSSAI_1 is same as the value of the SD o of the S-NSSAI_2, so the S-NSSAI_1 can be used simultaneously with the S-NSSAI_2. Thus the AMF 11 continues with the PDU session establishment procedure or Service Request procedure on the S-NSSAI_2.

If the process of step 3) in FIG. 4 is completed, the procedure proceeds to step 4) in FIG. 4.

4) Continue with PDU Session establishment or Service Request for the S-NSSAI_2 as per 3GPP TS 23.502 [NPL 3].

<Aspect 2: Network Based Solution 2—Failure Case>

Figure 7:
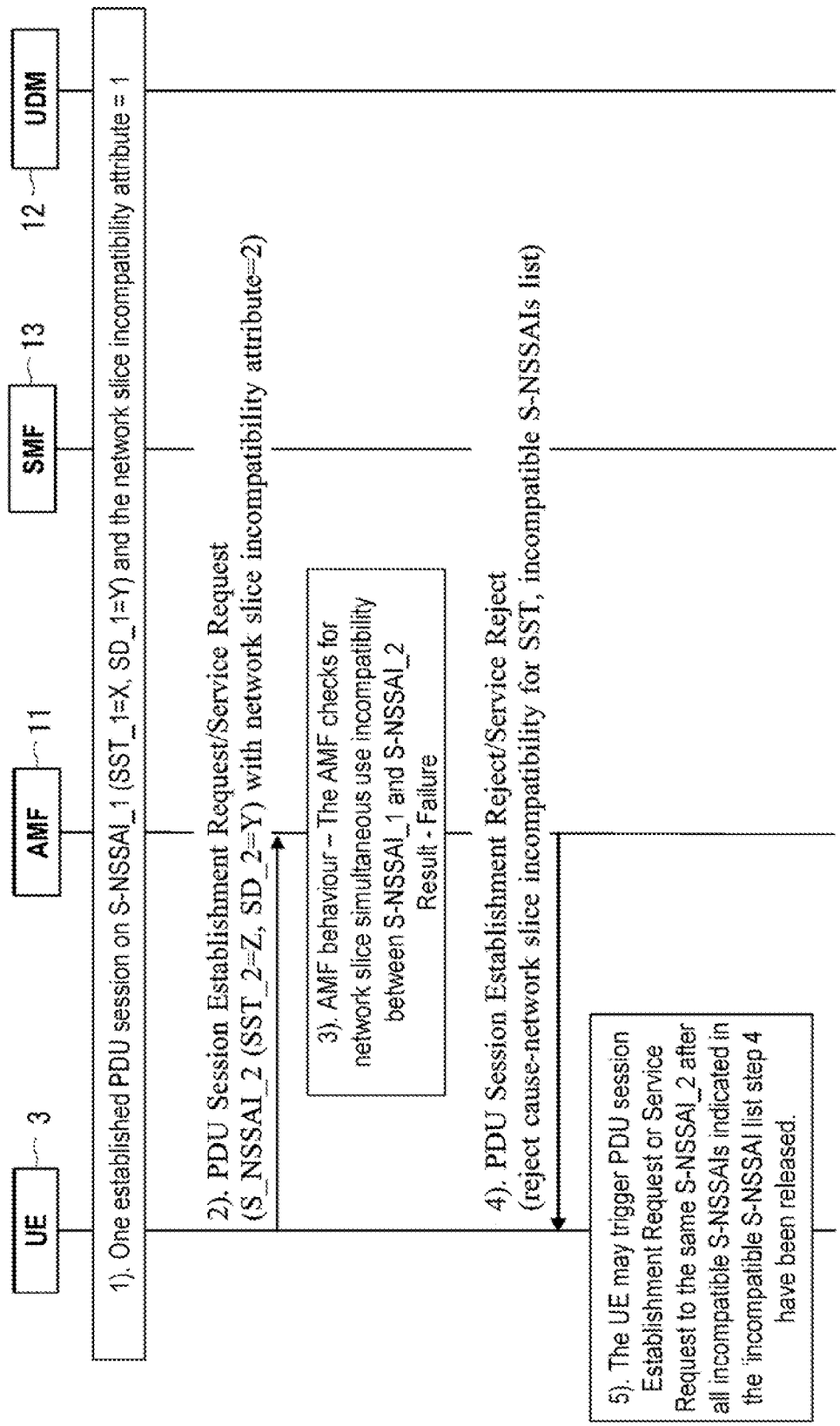
FIG. 7 is a timing (signalling) diagram illustrating schematically an exemplary method for providing support for incompatible network slices with a network based solution where a PDU Session Establishment Request or Service Request on a new network slice fails.

FIG. 7 is a timing (signalling) diagram illustrating schematically an exemplary method for providing support for incompatible network slices with a network based solution where a PDU Session Establishment Request or Service Request on a new network slice fails.

1). There is an already established PDU Session on an S-NSSAI_1 (SST_1=X, SD_1=Y) with a network slice incompatibility attribute=2, i.e. the network slice can be used simultaneously with any network slices with the same SD).

2). The UE 3 triggers a new PDU Session Establishment Request to establish a new PDU Session or a Service Request over an already established PDU Session on an S-NSSAI_2 (SST_2=Z, SD_2=Y) with a network slice incompatibility attribute=2, i.e. the network slice can be used simultaneously with any network slices with the same SD.

3). AMF behaviour—The AMF 11 checks for network slice simultaneous use incompatibility between S-NSSAI_1 and S-NSSAI_2 in order to decide whether to allow or reject the PDU Session establishment or Service Request on the S-NSSAI_2. The AMF 11 already holds in the UE context the incompatibility attributes for each of the S-NSSAIs in the allowed NSSAI of the UE 3, acquired during the UE registration. There are two alternatives:

Alternative A:

Network slice simultaneous use incompatibility is per established PDU sessions. Simultaneous PDU Sessions on different network slices can be restricted subject to the network slices incompatibility attributes of these network slices. It means that the AMF 11 shall not allow a new PDU Session on a new network slice if:

(the new network slice is incompatible with any other network slice on which a PDU Session has already been established) OR (any network slice on which a PDU Session has already been established is incompatible with the new network slice on which the UE 3 wants to establish a new PDU Session).

Figure 8:
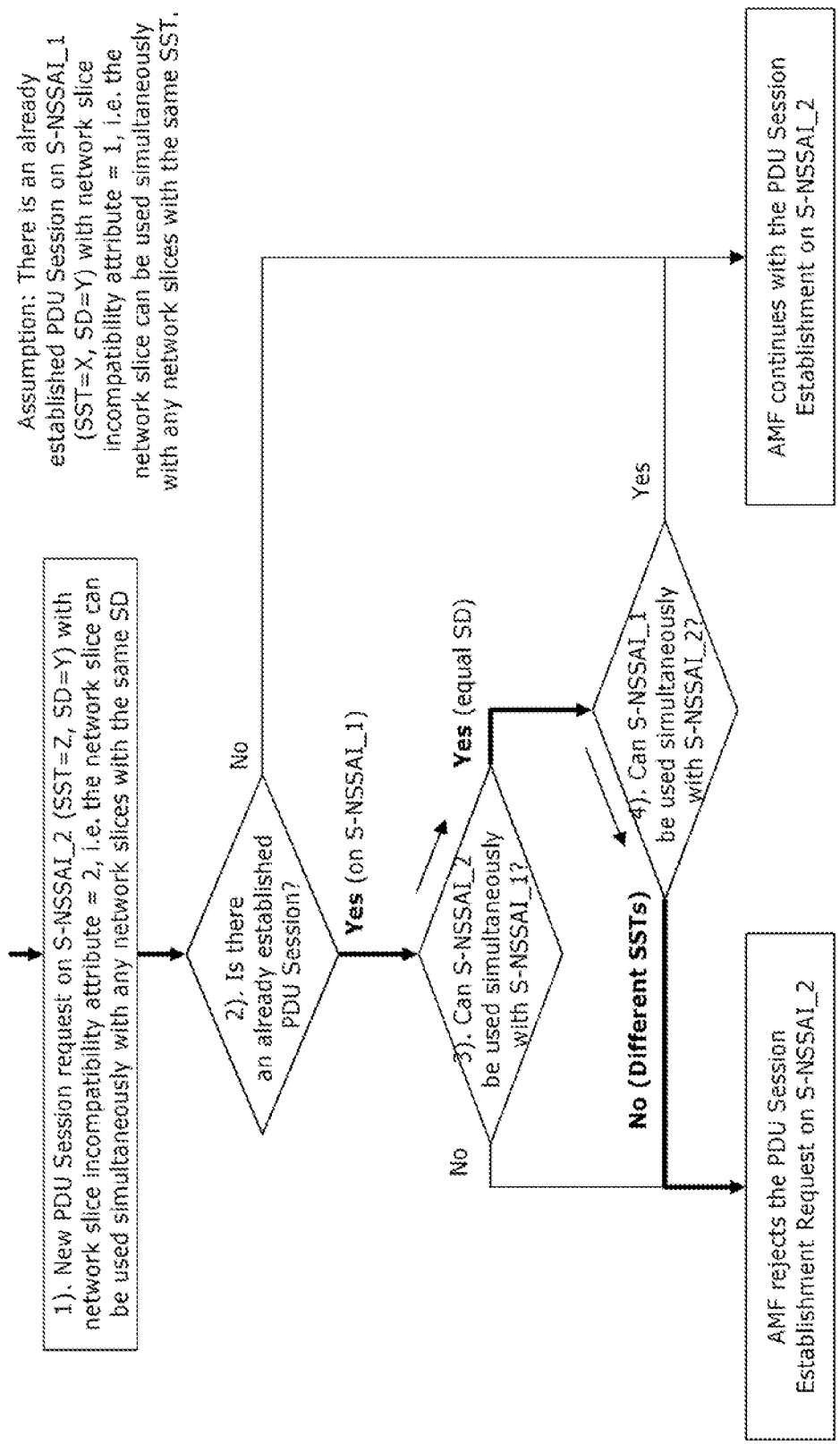
FIG. 8 is a flowchart illustrating an example of the AMF behaviour for Alternative A (solution 2, failure case)

FIG. 8 is a flowchart illustrating an example of the AMF behaviour for Alternative A (solution 2, failure case).

In this example in FIG. 8, as an assumption, there is an already established PDU session on an S-NSSAI_1 (SST="X", SD="Y") with a network slice incompatibility attribute=1, i.e. the network slice can be used simultaneously with any network slices with the same SST. The process starts from step 1).

1). AMF 11 receives a new PDU Session Establishment Request on an S-NSSAI_2 (SST="Z", SD="Y") with a network slice incompatibility attribute=2, i.e. the network slice can be used simultaneously with any network slices with the same SD.

2). The AMF 11 determines whether there is an already established PDU session on a network slice different than the S-NSSAI_2. If the AMF 11 determines that there is no established PDU session, then the AMF 11 continues with the PDU session establishment procedure on the S-NSSAI_2. Otherwise, if the AMF 11 determines that there is an already established PDU session on a network slice different than the S-NSSAI_2, then the process proceeds to the next step 3).

In this example, since there is an already established PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already established PDU sessions on more than one network slices, then the AMF 11 shall determine whether the S-NSSAI_2 can be used simultaneously with each of these network slices one by one.

In this example, as there is an already established PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure on the S-NSSAI_2. Otherwise, if the AMF 11 determines that the S-NSSAI_1 cannot be used simultaneously with the S-NSSAI_2, then the AMF 11 rejects the PDU session establishment procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already established PDU sessions on more than one network slices, then the AMF 11 shall determine whether each one of these network slices can be used simultaneously with the S-NSSAI_2.

In this example, as there is an already established PDU session on the S-NSSAI_1 and since the value of the network slice incompatibility attribute of the S-NSSAI_1 is 1 (i.e. the S-NSSAI_1 can be used simultaneously with the S-NSSAI_2 only if they have the same SST value) and as the value of the SST of the S-NSSAI_1 is different from the SST value of the S-NSSAI_2, so the S-NSSAI_1 cannot be used simultaneously with the S-NSSAI_2 for difference in the SST values. Thus the AMF 11 rejects the PDU session establishment procedure on the S-NSSAI_2.

Alternative B:

Network slice simultaneous use incompatibility is per active PDU sessions. Simultaneous PDU Sessions on different network slices can be restricted subject to the network slices incompatibility attributes of these network slices. It means that the AMF 11 shall not allow for a new PDU Session Establishment or Service Request on a new network slice if:

(the new network slice is incompatible with any other network slice on which there is an active PDU Session) OR (any network slice on which there is an active PDU Session is incompatible with the new network slice on which the UE 3 wants to establish a new PDU Session or activate an already established but non-active PDU Session)

Figure 9:
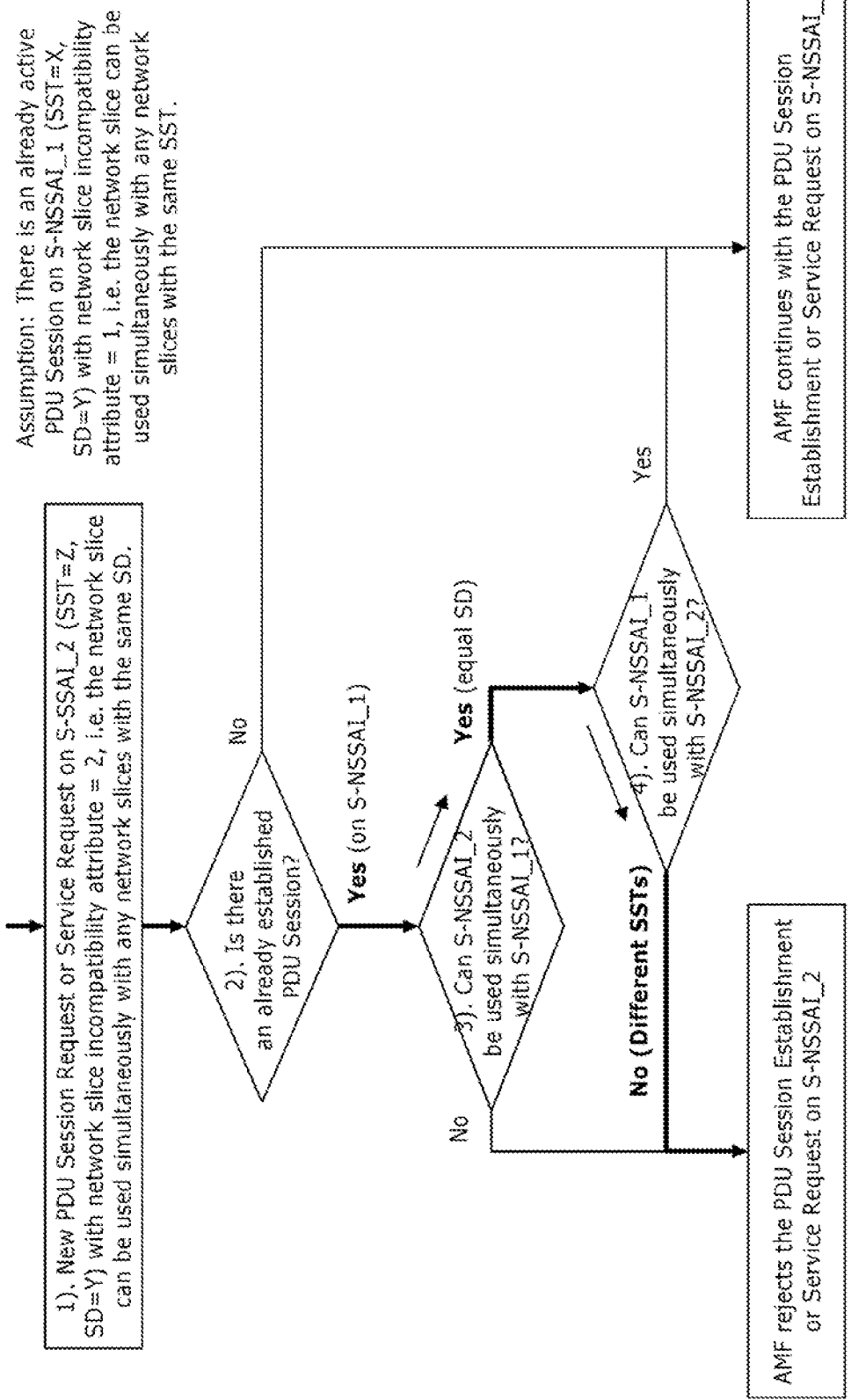
FIG. 9 is a flowchart illustrating an example of the AMF behaviour for Alternative B (solution 2, failure case)

FIG. 9 is a flowchart illustrating an example of the AMF behaviour for Alternative B (solution 2, failure case).

In this example in FIG. 9, as an assumption, there is an already active PDU session on an S-NSSAI_1 (SST="X", SD="Y") with a network slice incompatibility attribute=1, i.e. the network slice can be used simultaneously with any network slices with the same SST. The process starts from step 1).

1). AMF 11 receives a new PDU Session Establishment Request or Service Request on an S-NSSAI_2 (SST="Z", SD="Y") with a network slice incompatibility attribute=2, i.e. the network slice can be used simultaneously with any network slices with the same SD.

2). The AMF 11 determines whether there is an already active PDU session on a network slice different than the S-NSSAI_2. If the AMF 11 determines that there is no active PDU session, then the AMF 11 continues with the PDU session establishment or Service Request procedure on the S-NSSAI_2. Otherwise, if the AMF 11 determines that there is an already active PDU session on a network slice different than the S-NSSAI_2, then the process proceeds to the next step 3).

In this example, since there is an already active PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment procedure or Service Request procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already active PDU sessions on more than one network slices, then the AMF 11 shall determine whether the S-NSSAI_2 can be used simultaneously with each of these network slices one by one.

In this example, as there is an already active PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure or Service Request procedure on the S-NSSAI_2. Otherwise, if the AMF 11 determines that the S-NSSAI_1 cannot be used simultaneously with the S-NSSAI_2, then the AMF 11 rejects the PDU session establishment procedure or the Service Request procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already active PDU sessions on more than one network slices, then the AMF 11 shall determine whether each one of these network slices can be used simultaneously with the S-NSSAI_2.

In this example, as there is an already active PDU session on the S-NSSAI_1 and since the value of the network slice incompatibility attribute of the S-NSSAI_1 is 1 (i.e. the S-NSSAI_1 can be used simultaneously with the S-NSSAI_2 only if they have the same SST value) and as the value of the SST of the S-NSSAI_1 is different from the SST value of the S-NSSAI_2, so the S-NSSAI_1 cannot be used simultaneously with the S-NSSAI_2 for difference in the SST values. Thus the AMF 11 rejects the PDU session establishment or Service Request procedure on the S-NSSAI_2.

If the process of step 3) in FIG. 7 is completed, the procedure proceeds to step 4) in FIG. 7.

4) AMF 11 rejects the PDU Session Request/Service Request on the S-NSSAI_2. The AMF 11 may include in the PDU Session Establishment Reject/Service Reject message a reject cause 'network slice incompatibility for SST' or any other notation for a reject cause which has the purpose to indicate rejection for network slice incompatibility, based on the network slice's SST (Slice Service Type), SD (Service Discriminator) or based on the network slice incompatibility attribute 3, i.e. the network slice is incompatible with any other network slice. The AMF 11 may also include in the rejection message the list of the network slices with which the rejected network slice (e.g. the S-NSSAI_2) is incompatible for simultaneous use.

5) If the UE 3 received a list of network slices that are incompatible with the rejected network slice (e.g. the S-NSSAI_2):

Alternative A:

The UE 3 shall not trigger another PDU Session Establishment Request on the rejected network slice (e.g. the S-NSSAI_2) until all PDU Sessions on the reported in step 4) incompatible network slices are released. The UE 3 may trigger another PDU Session Establishment Request to the rejected S-NSSAI_2 after all PDU Sessions on the incompatible S-NSSAIs indicated in the 'incompatible S-NSSAI list' in step 4) have been released.

Alternative B:

The UE 3 shall not trigger another PDU Session Establishment Request or Service Request on the rejected network slice (e.g. the S-NSSAI_2) until there is an active PDU Sessions running on the reported in step 4) incompatible network slices. The UE 3 may trigger another PDU Session Establishment Request or Service Request on the rejected S-NSSAI_2 after all PDU Sessions on the incompatible S-NSSAIs indicated in the 'incompatible S-NSSAI list' in step 4) have been released or deactivated (e.g. became non-active).

<Aspect 3: Network Based Solution 2—Replacement Case>

Figure 10:
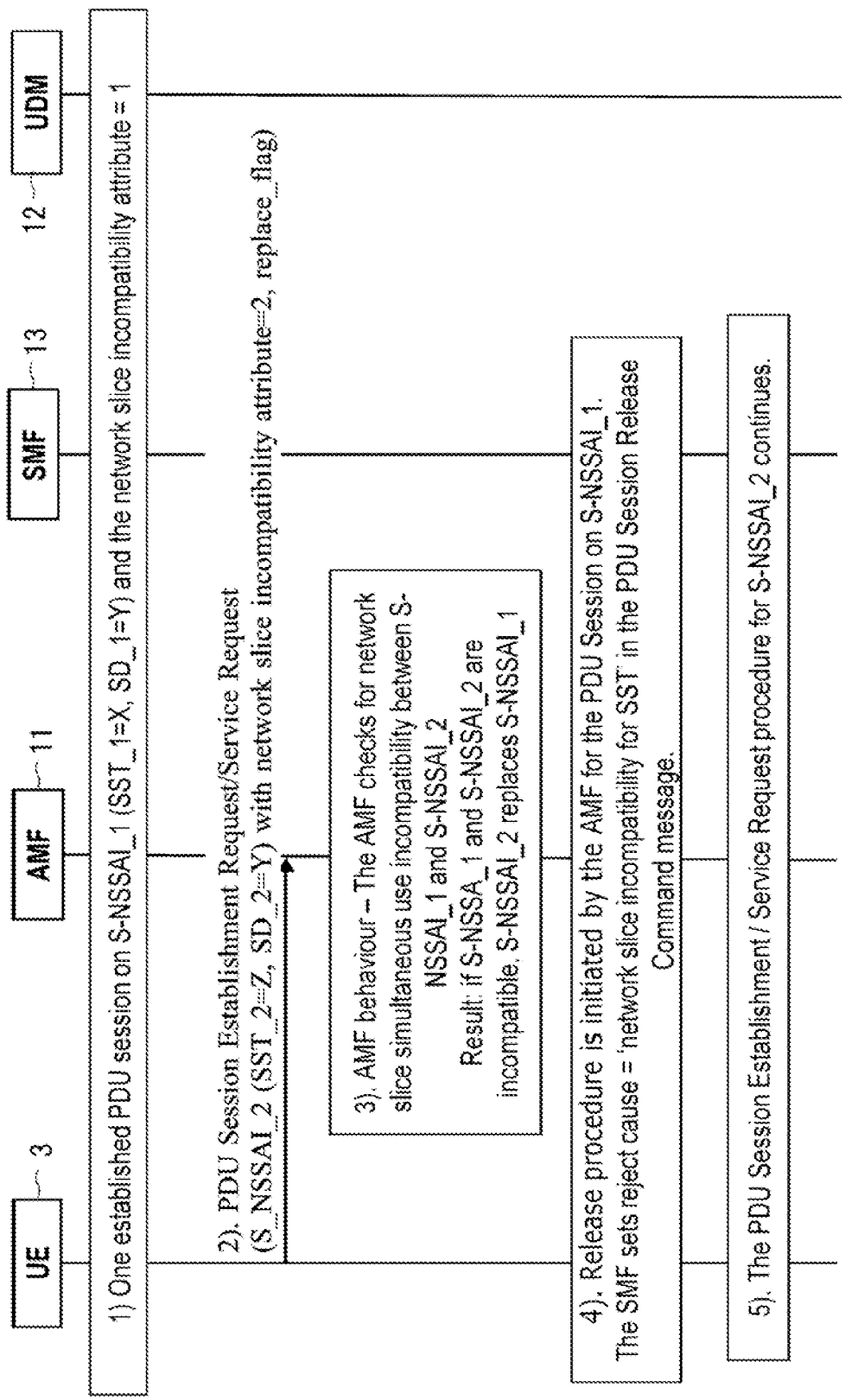
FIG. 10 is a timing (signalling) diagram illustrating schematically an exemplary method for providing support for incompatible network slices with a network based solution where a PDU Session Establishment Request or Service Request on a new network slice (e.g. an S-NSSAI_2) replaces an already established PDU Session(s) on network slice(s) (e.g. an S-NSSAI_1) that are incompatible for simultaneous use with the network slice S-NSSAI_2 on which the new PDU Session Establishment or Service Request is triggered.

FIG. 10 is a timing (signalling) diagram illustrating schematically an exemplary method for providing support for incompatible network slices with a network based solution where a PDU Session Establishment Request or Service Request on a new network slice (e.g. an S-NSSAI_2) replaces an already established PDU Session(s) on network slice(s) (e.g. an S-NSSAI_1) that are incompatible for simultaneous use with the network slice S-NSSAI_2 on which the new PDU Session Establishment or Service Request is triggered.

1). There is an already established PDU Session on an S-NSSAI_1 (SST_1=X, SD_1=Y) with a network slice incompatibility attribute=2, i.e. the network slice can be used simultaneously with any network slices with the same SD.

2). The UE 3 triggers a new PDU Session Establishment Request to establish a new PDU Session or a Service Request over an already established PDU Session on an S-NSSAI_2 (SST_2=Z, SD_2=Y) with a network slice incompatibility attribute=2, i.e. the network slice can be used simultaneously with any network slices with the same SD. The UE 3 also includes replace_flag in the PDU Session Establishment Request or Service Request. The replace-flag is to indicate that if there are PDU Session(s) established on other network slices that are incompatible for simultaneous use with the network slice (e.g. the S-NSSAI_2) on which the UE 3 triggers a new PDU Session Establishment Request or Service Request and the UE 3 includes the replace_flag, the network shall release the PDU Session(s) on the network slice(s) that are incompatible with the network slice S-NSSAI_2 in order to continue the PDU Session Establishment or Service Request on network slice S-NSSAI_2.

The replace flag can be also used with different scope granularity, e.g.:
  replace_flag—replace in case of any network slice simultaneous usage incompatibility.
  sst_replace_flag—replace in case of network slice simultaneous usage incompatibility for the SST only.
  sd_replace_flag—replace in case of network slice simultaneous usage incompatibility for the SD only.

3). AMF behaviour—The AMF 11 checks for network slice simultaneous use incompatibility between the S-NSSAI_1 and the S-NSSAI_2 in order to decide whether there is an existing PDU Session(s) on network slice(s) (e.g. the S-NSSAI_1) that are incompatible for simultaneous use with the network slice (e.g. the S-NSSAI_2) on which a PDU Session or Service Request with the replace_flag was triggered. The AMF 11 already holds in the UE context the incompatibility attributes for each of the S-NSSAIs in the allowed NSSAI of the UE 3, acquired during the UE registration. There are two alternatives:

Alternative A:
Network slice simultaneous use incompatibility is per established PDU sessions. Simultaneous PDU Sessions on different network slices can be restricted subject to the network slices incompatibility attributes of these network slices. It means that the AMF 11 shall not allow a new PDU Session on a new network slice if:
  (the new network slice is incompatible with any other network slice on which a PDU Session has already been established) OR
  (any network slice on which a PDU Session has already been established is incompatible with the new network slice on which the UE 3 wants to establish a new PDU Session).

Figure 11:
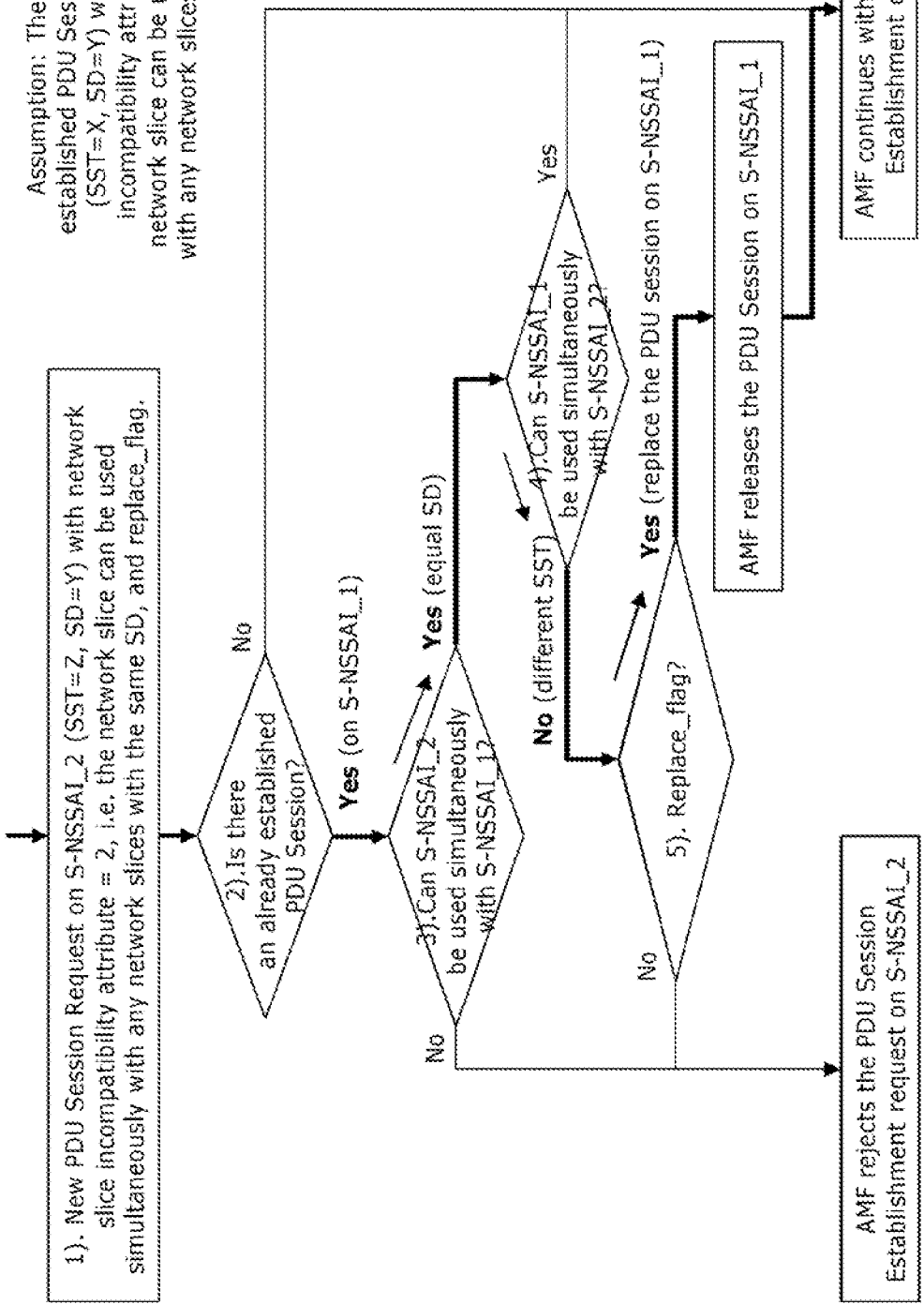
FIG. 11 is a flowchart illustrating an example of the AMF behaviour for Alternative A (solution 2, replacement case)

FIG. 11 is a flowchart illustrating an example of the AMF behaviour for Alternative A (solution 2, replacement case).

In this example in FIG. 11, as an assumption, there is an already established PDU session on an S-NSSAI_1 (SST="X", SD="Y") with a network slice incompatibility attribute=1, i.e. the network slice can be used simultaneously with any network slices with the same SST. The process starts from step 1).

1). AMF 11 receives a new PDU Session Establishment Request on an S-NSSAI_2 (SST="Z", SD="Y") with a network slice incompatibility attribute=2, i.e. the network slice can be used simultaneously with any network slices with the same SD.

2). The AMF 11 determines whether there is an already established PDU session on a network slice different than the S-NSSAI_2. If the AMF 11 determines that there is no established PDU session, then the AMF 11 continues with the PDU session establishment procedure on the S-NSSAI_2. Otherwise, if the AMF 11 determines that there is an already established PDU session on a network slice different than the S-NSSAI_2, then the process proceeds to the next step 3).

In this example, since there is an already established PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already established PDU sessions on more than one network slices, then the AMF 11 shall determine whether the S-NSSAI_2 can be used simultaneously with each of these network slices one by one.

In this example, as there is an already established PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure on the S-NSSAI_2. Otherwise, if the AMF 11 determines that the S-NSSAI_1 cannot be used simultaneously with the S-NSSAI_2, then the procedure proceeds to step 5).

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already established PDU sessions on more than one network slices, then the AMF 11 shall determine whether each one of these network slices can be used simultaneously with the S-NSSAI_2.

In this example, as there is an already established PDU session on the S-NSSAI_1 and since the value of the network slice incompatibility attribute of the S-NSSAI_1 is 1 (i.e. the S-NSSAI_1 can be used simultaneously with the S-NSSAI_2 only if they have the same SST value) and as the value of the SST of the S-NSSAI_1 is different from the SST value of the S-NSSAI_2, so the S-NSSAI_1 cannot be used simultaneously with the S-NSSAI_2 for difference in the SST values. Thus the process proceeds to the next step 5).

5). The AMF 11 checks for a 'replace_flag', i.e. whether there is a 'replace flag' in the new PDU Session Establishment Request on the S-NSSAI_2 from the UE 3. If there is no 'replace_flag' in the new PDU Session Establishment procedure from the UE 3, the incompatibility mismatch between the S-NSSAI_1 and the S-NSSAI_2 for different SST values is valid and the AMF 11 shall reject the PDU Session Establishment Request on the S-NSSAI_2. Otherwise, if there is a 'replace_flag' included in the PDU Session Establishment Request message from the UE 3, then the AMF 11 shall release all active PDU sessions on the network slices that are incompatible with the S-NSSAI_1 and the AMF 11 shall continue with the PDU session establishment procedure on the S-NSSAI_2.

In this example, as there is a 'replace_flag' included in the PDU Session Establishment Request from the UE on the S-NSSAI_2, the AMF 11 releases the existing active PDU session on the S-NSSAI_1 and continues with the PDU session establishment procedure on the S-NSSAI_2.

Alternative B:

Network slice simultaneous use incompatibility is per active PDU sessions. Simultaneous PDU Sessions on different network slices can be restricted subject to the network slices incompatibility attributes of these network slices. It means that the AMF 11 shall not allow for a new PDU Session Establishment or Service Request on a new network slice if:

(the new network slice is incompatible with any other network slice on which there is an active PDU Session) OR (any network slice on which there is an active PDU Session is incompatible with the new network slice on which the UE 3 wants to establish a new PDU Session or activate an already established but non-active PDU Session).

Figure 12:
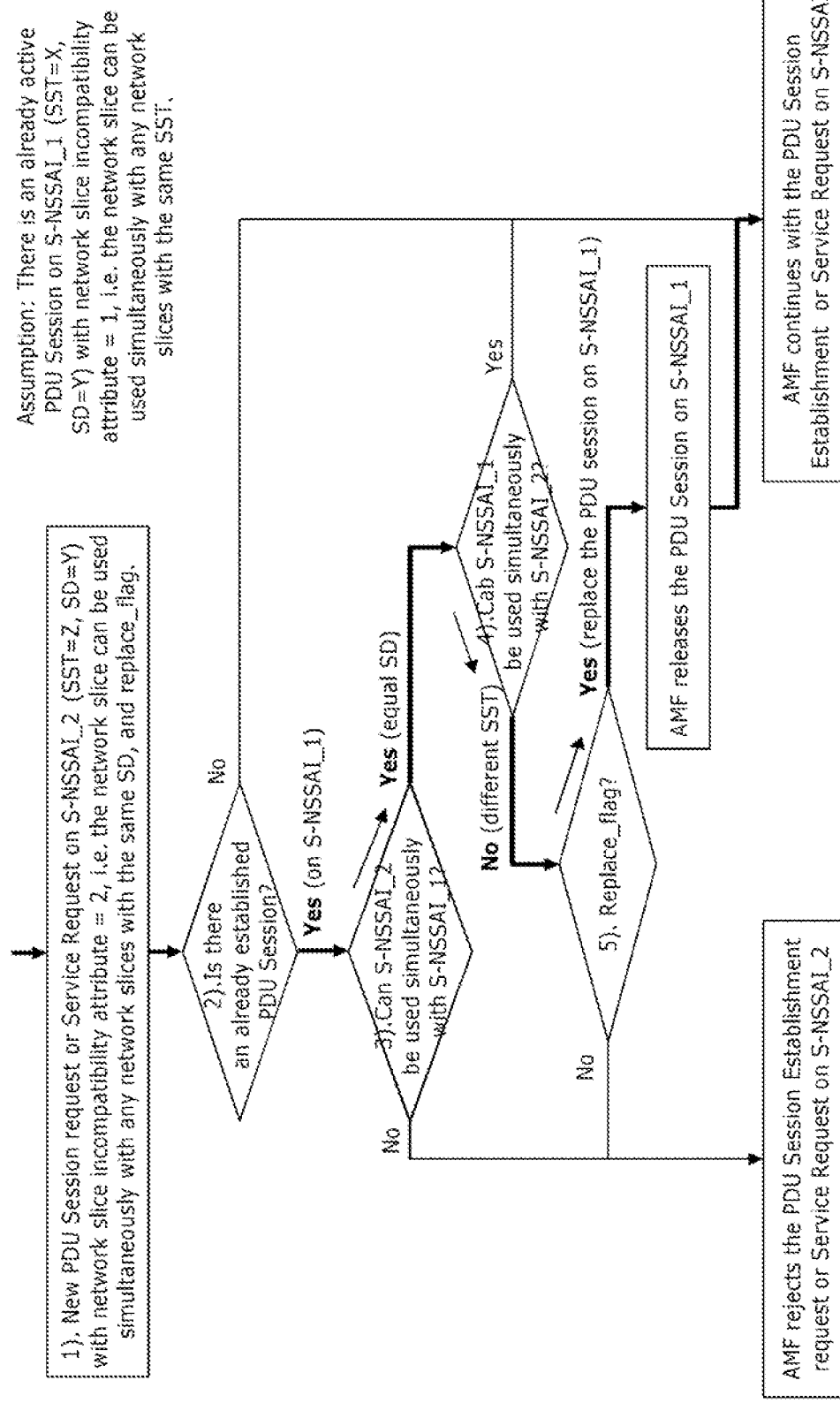
FIG. 12 is a flowchart illustrating an example of the AMF behaviour for Alternative B (solution 2, replacement case)

FIG. 12 is a flowchart illustrating an example of the AMF behaviour for Alternative B (solution 2, replacement case).

In this example in FIG. 12, as an assumption, there is an already active PDU session on an S-NSSAI_1 (SST="X", SD="Y") with a network slice incompatibility attribute=1, i.e. the network slice can be used simultaneously with any network slices with the same SST. The process starts from step 1).

1). AMF 11 receives a new PDU Session Establishment Request or Service Request on an S-NSSAI_2 (SST="Z", SD="Y") with a network slice incompatibility attribute=2, i.e. the network slice can be used simultaneously with any network slices with the same SD.

2). The AMF 11 determines whether there is an already active PDU session on a network slice different than the S-NSSAI_2. If the AMF 11 determines that there is no active PDU session, then the AMF 11 continues with the PDU session establishment procedure or Service Request procedure on the S-NSSAI_2. Otherwise, if the AMF 11 determines that there is an already active PDU session on a network slice different than the S-NSSAI_2, then the process proceeds to the next step 3).

In this example, since there is an already active PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 4). Otherwise, if the AMF 11 determines that the S-NSSAI_2 cannot be used simultaneously with the S-NSSAI_1, then the AMF 11 rejects the PDU session establishment or Service Request procedure on the S-NSSAI_2.

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already active PDU sessions on more than one network slices, then the AMF 11 shall determine whether the S-NSSAI_2 can be used simultaneously with each of these network slices one by one.

In this example, as there is an already active PDU session only on the S-NSSAI_1 and since the value of the network slice incompatibility attribute of the S-NSSAI_2 is 2, and the value of the SD of the S-NSSAI_2 is same as the value of the SD of the S-NSSAI_1, so the S-NSSAI_2 can be used simultaneously with the S-NSSAI_1. Thus the process proceeds to the next step 4).

4). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF determines that the S-NSSAI_1 can be used simultaneously with the S-NSSAI_2, then the AMF 11 continues with the PDU session establishment or Service Request procedure on the S-NSSAI_2. Otherwise, if the AMF 11 determines that the S-NSSAI_1 cannot be used simultaneously with the S-NSSAI_2, then the procedure proceeds to the step 5).

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already active PDU sessions on more than one network slices, then the AMF 11 shall determine whether each one of these network slices can be used simultaneously with the S-NSSAI_2.

In this example, as there is an already active PDU session on the S-NSSAI_1 and since the value of the network slice incompatibility attribute of the S-NSSAI_1 is 1 (i.e. the S-NSSAI_1 can be used simultaneously with the S-NSSAI_2 only if they have the same SST value) and as the value of the SST of the S-NSSAI_1 is different from the SST value of the S-NSSAI_2, so the S-NSSAI_1 cannot be used simultaneously with the S-NSSAI_2 for difference in the SST values. Thus the process proceeds to the next step 5).

5). The AMF 11 checks for a 'replace_flag', i.e. whether there is a 'replace flag' in the new PDU Session Establishment Request on the S-NSSAI_2 from the UE 3. If there is no 'replace_flag' in the new PDU Session Establishment procedure from the UE 3, the incompatibility mismatch between the S-NSSAI_1 and the S-NSSAI_2 for different SST values is valid and the AMF 11 shall reject the PDU Session Establishment Request on the S-NSSAI_2. Otherwise, if there is a 'replace_flag' included in the PDU Session Establishment Request message from the UE 3, then the AMF 11 shall release all active PDU sessions on the network slices that are incompatible with the S-NSSAI_1 and the AMF 11 shall continue with the PDU session establishment or Service Request procedure on the S-NSSAI_2.

In this example, as there is a 'replace_flag' included in the PDU Session Establishment Request from the UE 3 on the S-NSSAI_2, the AMF 11 releases the existing active PDU session on the S-NSSAI_1 and continues with the PDU session establishment or Service Request procedure on the S-NSSAI_2.

If the process of step 3) in FIG. 10 is completed, the procedure proceeds to step 4) in FIG. 10.

4). Release procedure is initiated by the AMF 11 for the PDU Session on the S-NSSAI_1. The AMF 11 invokes the Nsmf_PDUSession-UpdateSMContext service operation to the SMF 13 in order to release the PDU Session on the S-NSSAI_1. The AMF 11 includes the reject cause 'network slice incompatibility for SST' in the Nsmf_PDUSession-UpdateSMContext message. The SMF 13 sets a reject cause='network slice incompatibility for SST' in the PDU Session Release Command message and sends it to the UE 3 via the AMF 11. When a PDU Session is released with a reject cause for network slice incompatibility, the UE 3 shall not trigger another PDU Session Request on the network slice(s) on which the PDU session was released until the release of the PDU Session that replaced the released PDU Sessions. In case that the AMF 11 receives the service request message from the UE 3 in step 2, The AMF 11 indicates the SMF 13 to deactivate the PDU session on the S-NSSAI_1 instead of releasing it.

5) The PDU Session Establishment procedure or Service Request on the S-NSSAI_2 continues as per 3GPP TS 23.502 [NPL 3].

<Aspect 4: Network Based Solution 2—Over-Write Case>

Figure 13:
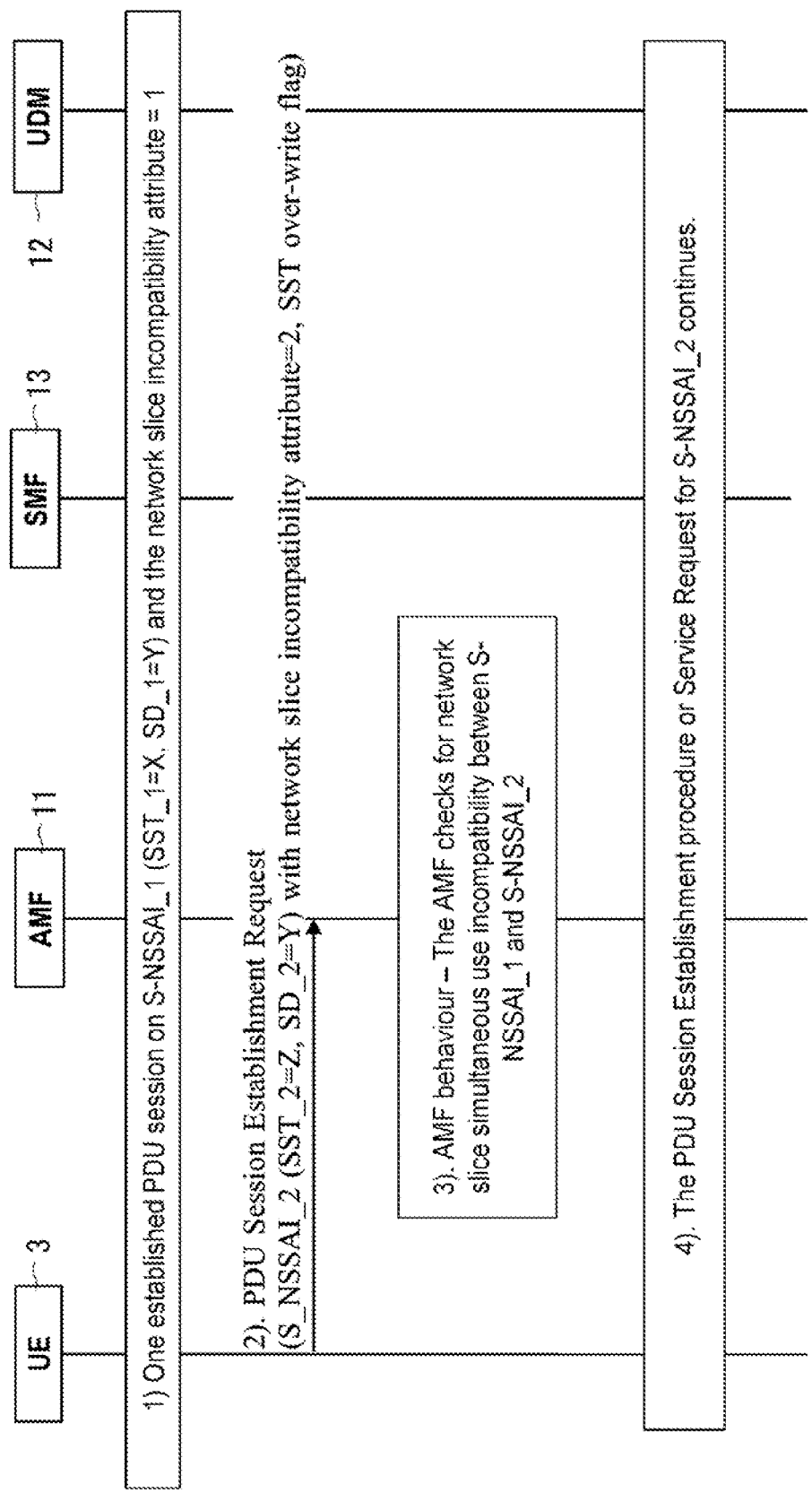
FIG. 13 is a timing (signalling) diagram illustrating schematically an exemplary network based solution for network slice simultaneous use incompatibility support where a PDU Session Establishment Request or Service Request on a new network slice (e.g. an S-NSSAI_2) over-writes its network slice simultaneous use incompatibility towards an S_NSSAI_1 (on which there are already established PDU Sessions)

FIG. 13 is a timing (signalling) diagram illustrating schematically an exemplary network based solution for network slice simultaneous use incompatibility support where a PDU Session Establishment Request or Service Request on a new network slice (e.g. an S-NSSAI_2) over-writes its network slice simultaneous use incompatibility towards an S-NSSAI_1 (on which there are already established PDU Sessions). This means that for the S-NSSAI_2 the network slice simultaneous use incompatibility towards the network slice S-NSSAI_1 is over-written, i.e. ignored. However the network slice simultaneous use incompatibility of the network slice S-NSSAI_1 (on which there is an established PDU session) towards the network slice S-NSSAI_2 on which the new PDU Session Request or Service Request is triggered) still applies.

1). There is an already established PDU Session on an S-NSSAI_1 (SST_1=X, SD_1=Y) with a network slice incompatibility attribute=2, i.e. the network slice can be used simultaneously with any network slices with the same SD.

2). The UE 3 triggers a new PDU Session Establishment Request to establish a new PDU Session or a Service Request over an already established PDU Session on an S-NSSAI_2 (SST_2=Z, SD_2=Y) with a network slice incompatibility attribute=2, i.e. the network slice can be used simultaneously with any network slices with the same SD. The UE 3 also includes an 'sst_over-write_flag'. The 'sst_over-write_flag' is to indicate that if there are PDU Session(s) established on other network slices (e.g. the S-NSSAI_1) with which the UE 3 triggered new PDU Session Establishment Request or Service Request on network slice (e.g. the S-NSSAI_2) is incompatible because of incompatible SST(s), the SST incompatibility shall be ignored (over-written) if the UE 3 includes the 'sst_over-write_flag' in the new PDU Session Establishment Request or Service Request on the S-NSSAI_2. However, the opposite (S-NSSAI_1 incompatibility with S-NSSAI_2), if any, still applies.

The sst_over-write_flag can be also used with different scope granularity, e.g.:
- over-write_flag—ignore any incompatibility with the network slices in use but not the reverse incompatibility (i.e. the incompatibility of the network slices in use with the new network slice is still valid).
- sst_over-write_flag—ignore only the SST incompatibility with the network slices in use but not the reverse incompatibility (i.e. the incompatibility of the network slices in use with the new network slice is still valid).
- sd_over-write_flag—ignore only the SD incompatibility with the network slices in use but not the reverse incompatibility (i.e. the incompatibility of the network slices in use with the new network slice is still valid).

3). AMF behaviour—The AMF 11 checks for network slice simultaneous use incompatibility between the S-NSSAI_1 and the S-NSSAI_2. The AMF 11 already holds in the UE context the incompatibility attributes for each of the S-NSSAIs in the allowed NSSAI of the UE 3, acquired during the UE registration. There are two alternatives:

Alternative A:

Network slice simultaneous use incompatibility is per established PDU sessions. Simultaneous PDU Sessions on different network slices can be restricted subject to the network slices incompatibility attributes of these network slices. It means that the AMF 11 shall not allow a new PDU Session on a new network slice if:
- (the new network slice is incompatible with any other network slice on which a PDU Session has already been established) OR
- (any network slice on which a PDU Session has already been established is incompatible with the new network slice on which the UE 3 wants to establish a new PDU Session).

Figure 14:
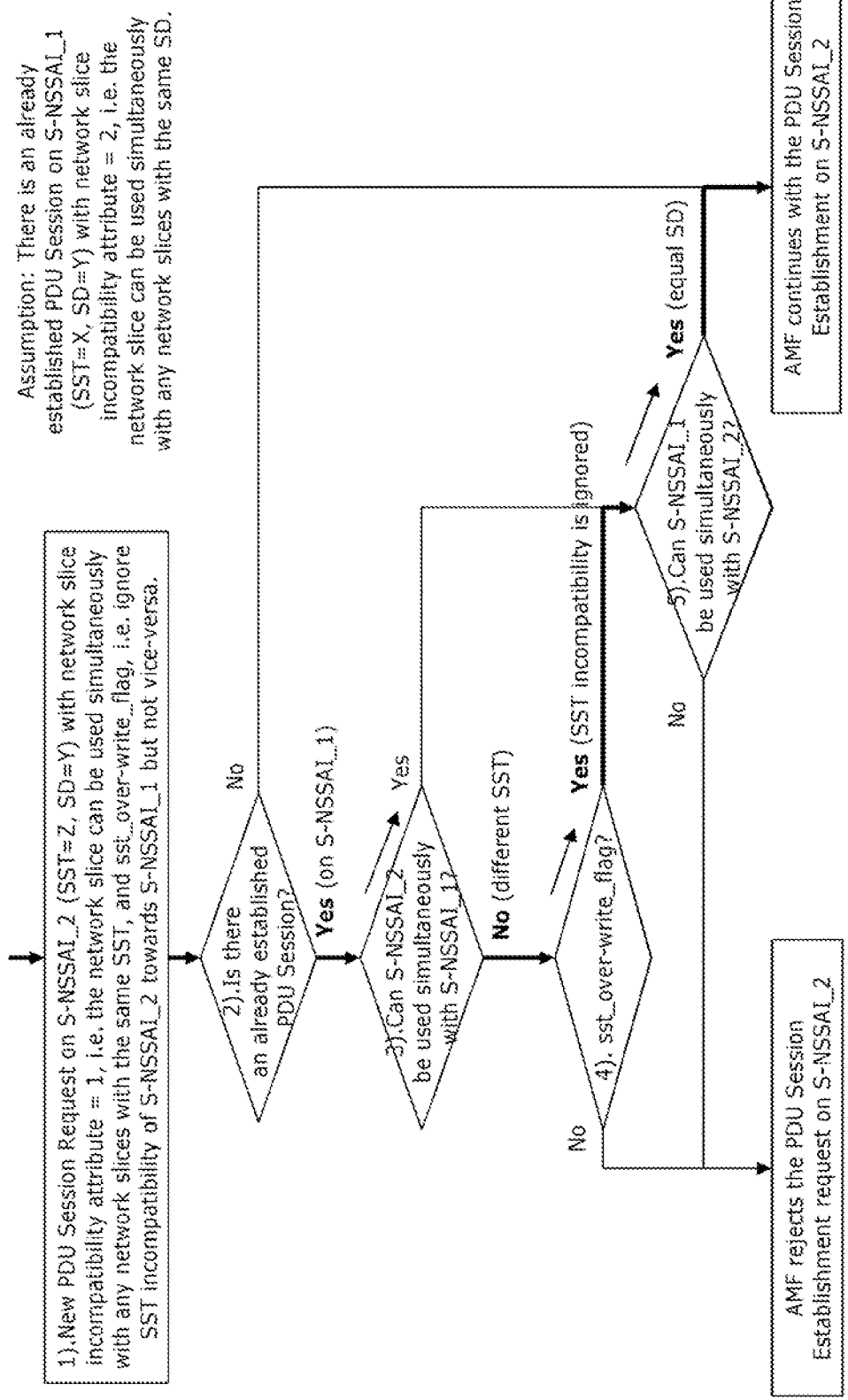
FIG. 14 is a flowchart illustrating an example of the AMF behaviour for Alternative A (solution 2, over-write case)

FIG. 14 is a flowchart illustrating an example of the AMF behaviour for Alternative A (solution 2, over-write case).

In this example in FIG. 14, as an assumption, there is an already established PDU session on an S-NSSAI_1 (SST="X", SD="Y") with a network slice incompatibility attribute=2, i.e. the network slice can be used simultaneously with any network slices with the same SD. The process starts from step 1).

1). The AMF 11 receives a new PDU Session Establishment Request on an S-NSSAI_2 (SST="Z", SD="Y") with a network slice incompatibility attribute=1, i.e. the network slice can be used simultaneously with any network slices with the same SST.

2). The AMF 11 determines whether there is an already established PDU session on a network slice different than the S-NSSAI_2. If the AMF 11 determines that there is no established PDU session, then the AMF 11 continues with the PDU session establishment procedure on the S-NSSAI_2. Otherwise, if the AMF 11 determines that there is an already established PDU session on a network slice different than the S-NSSAI_2, then the process proceeds to the next step 3).

In this example, since there is an already established PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 5). Otherwise, if the AMF 11 determines that the S-NSSAI_2 cannot be used simultaneously with the S-NSSAI_1, then the procedure proceeds to step 4).

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already established PDU sessions on more than one network slices, then the AMF 11 shall determine whether the S-NSSAI_2 can be used simultaneously with each of these network slices one by one.

In this example, as there is an already established PDU session only on the S-NSSAI_1 and since the value of the network slice incompatibility attribute of the S-NSSAI_2 is 1, and the value of the SST of the S-NSSAI_2 is not the same as the value of the SST of the S-NSSAI_1, so the S-NSSAI_2 cannot be used simultaneously with the S-NSSAI_1 for difference in the SST values. Thus the process proceeds to the next step 4).

4). As the incompatibility of the S-NSSAI_2 with the S-NSSAI_1 is for deference in the SST value, the AMF 11 checks for an 'sst_over-write_flag', i.e. whether there is an 'sst_over-write_flag' included in the new PDU Session Establishment Request on the S-NSSAI_2 from the UE 3. If there is no 'sst_over-write_flag' in the new PDU Session Establishment Request from the UE 3, the incompatibility mismatch between S-NSSAI_2 and S-NSSAI_1 for different SST values is valid and the AMF 11 shall reject the PDU Session Establishment Request on the S-NSSAI_2. Otherwise, if there is an 'sst_over-write_flag' included in the PDU Session Establishment Request message from the UE 3, then the S-NSSAI_2 incompatibility with the S-NSSAI_1 for difference in the SST values is over-written, i.e. the incompatibility is ignored. And the process proceeds to the next step 5).

5). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure on the S-NSSAI_2. Otherwise, if the AMF 11 determines that the S-NSSAI_1 cannot be used simultaneously with the S-NSSAI_2, then the AMF 11 rejects the PDU session establishment procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already established PDU sessions on more than one network slices, then the AMF 11 shall determine whether each one of these network slices can be used simultaneously with the S-NSSAI_2.

In this example, as there is an already established PDU session on the S-NSSAI_1 and since the value of the network slice incompatibility attribute of the S-NSSAI_1 is 2 (i.e. the S-NSSAI_1 can be used simultaneously with the S-NSSAI_2 only if they have the same SD value) and as the value of the SD of the S-NSSAI_1 is same with SD value of the S-NSSAI_2, so the S-NSSAI_1 can be used simultaneously with the S-NSSAI_2. Thus the AMF 11 continues with the PDU session establishment procedure on the S-NSSAI_2.

Alternative B:

Network slice simultaneous use incompatibility is per active PDU sessions. Simultaneous PDU Sessions on different network slices can be restricted subject to the network slices incompatibility attributes of these network slices. It means that the AMF 11 shall not allow for a new PDU Session Establishment or Service Request on a new network slice if:

(the new network slice is incompatible with any other network slice on which there is an active PDU Session) OR (any network slice on which there is an active PDU Session is incompatible with the new network slice on which the UE 3 wants to establish a new PDU Session or activate an already established but non-active PDU Session).

Figure 15:
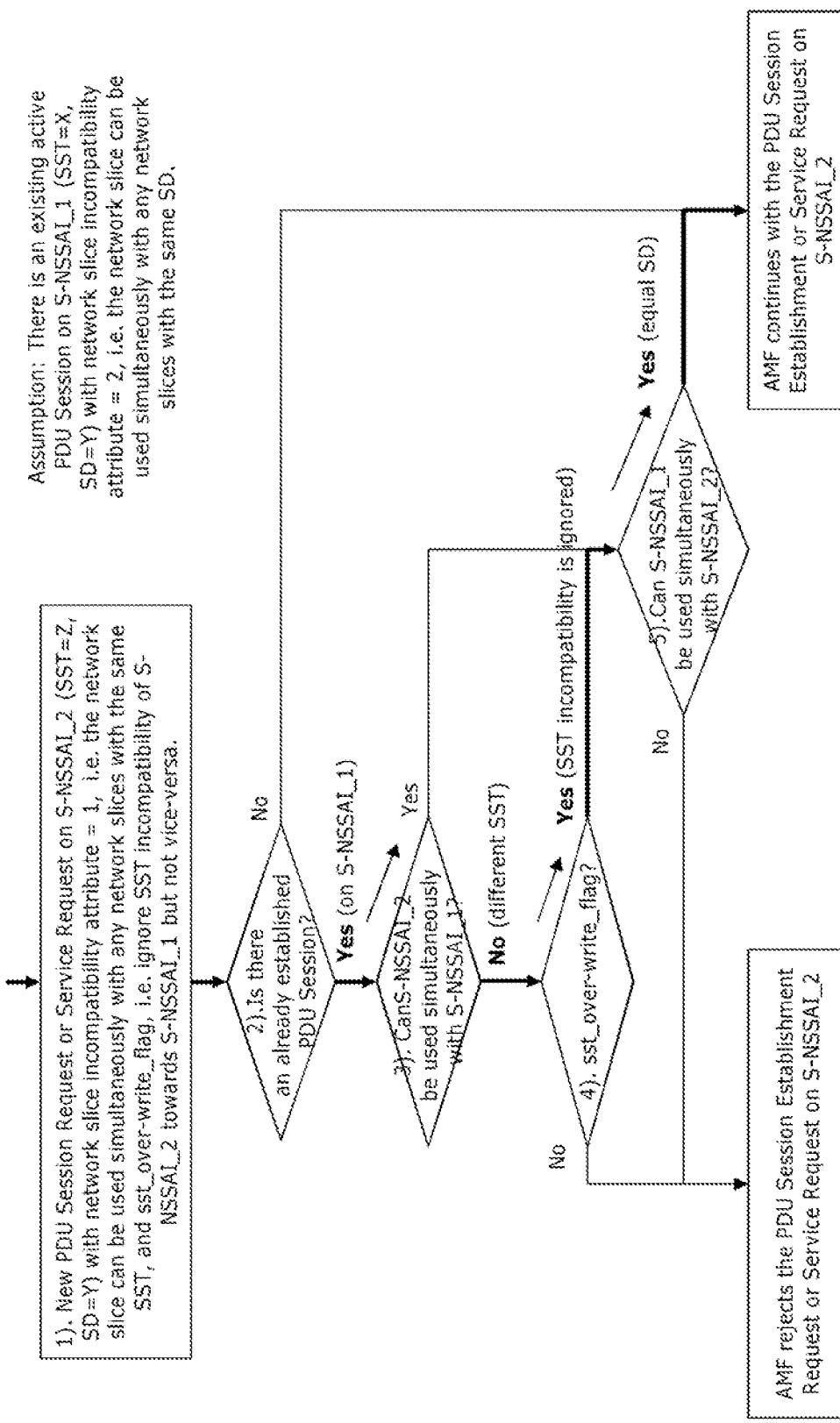
FIG. 15 is a flowchart illustrating an example of the AMF behaviour for Alternative B (solution 2, over-write case)

FIG. 15 is a flowchart illustrating an example of the AMF behaviour for Alternative B (solution 2, over-write case).

In this example in FIG. 15, as an assumption, there is an already active PDU session on an S-NSSAI_1 (SST="X", SD="Y") with a network slice incompatibility attribute=2, i.e. the network slice can be used simultaneously with any network slices with the same SD. The process starts from step 1).

1). AMF 11 receives a new PDU Session Establishment Request or Service Request on an S-NSSAI_2 (SST="Z", SD="Y") with a network slice incompatibility attribute=1, i.e. the network slice can be used simultaneously with any network slices with the same SST.

2). The AMF 11 determines whether there is an already established PDU session on a network slice different than the S-NSSAI_2. If the AMF 11 determines that there is no established PDU session, then the AMF 11 continues with the PDU session establishment procedure or Service Request procedure on the S-NSSAI_2. Otherwise, if the AMF 11 determines that there is an already active PDU session on a network slice different than the S-NSSAI_2, then the process proceeds to the next step 3).

In this example, since there is an already active PDU session, the process proceeds to the next step 3).

3). Check for S-NSSAI_2 simultaneous use incompatibility with S-NSSAI_1—The AMF 11 determines whether the S-NSSAI_2 can be used simultaneously with the S-NSSAI_1, based on considering the value of at least one of the SST, the SD, and the network slice incompatibility attribute of at least one of the S-NSSAI_2 and the S-NSSAI_1. If the AMF 11 determines that the S-NSSAI_2 can be used simultaneously with the S-NSSAI_1, then the procedure proceeds to step 5). Otherwise, if the AMF 11 determines that the S-NSSAI_2 cannot be used simultaneously with the S-NSSAI_1, then the procedure proceeds to step 4).

For example, in the case where the value of the network slice incompatibility attribute of the S-NSSAI_2 is 3, the S-NSSAI_2 cannot be used simultaneously with the S-NSSAI_1 regardless of the value of the SST, the SD, and the network slice incompatibility attribute of the S-NSSAI_1. In the case where the value of the network slice incompatibility attribute of the S-NSSAI_2 is 2, the S-NSSAI_2 can be used simultaneously with the S-NSSAI_1 if the value of the SD of the S-NSSAI_2 is same as the value of the SD of the S-NSSAI_1. In the case where the value of the network slice incompatibility attribute of the S-NSSAI_2 is 1, the S-NSSAI_2 can be used simultaneously with the S-NSSAI_1 if the value of the SST of the S-NSSAI_2 is same as the value of the SST of the S-NSSAI_1. In the case where the value of the network slice incompatibility attribute of the S-NSSAI_2 is 0, the S-NSSAI_2 can be used simultaneously with the S-NSSAI_1 regardless of the value of the SST, the SD, and the network slice incompatibility attribute of the S-NSSAI_1.

In case there are already active PDU sessions on more than one network slices, then the AMF 11 shall determine whether the S-NSSAI_2 can be used simultaneously with each of these network slices one by one.

In this example, as there is an already active PDU session only on the S-NSSAI_1 and since the value of the network slice incompatibility attribute of the S-NSSAI_2 is 1, and the value of the SST of the S-NSSAI_2 is not the same as the value of the SST of the S-NSSAI_1, so the S-NSSAI_2 cannot be used simultaneously with the S-NSSAI_1 for difference in the SST values. Thus the process proceeds to the next step 4).

4). As the incompatibility of the S-NSSAI_2 with the S-NSSAI_1 is for deference in the SST value, the AMF 11 checks for an 'sst_over-write_flag', i.e. whether there is an 'sst_over-write_flag' included in the new PDU Session Establishment Request or Service Request on the S-NSSAI_2 from the UE3. If there is no 'sst_over-write_flag' in the new PDU Session Establishment Request or Service Request from the UE3, the incompatibility mismatch between the S-NSSAI_2 and the S-NSSAI_1 for different SST values is valid and the AMF 11 shall reject the PDU Session Establishment Request or Service Request on the S-NSSAI_2. Otherwise, if there is an 'sst_over-write_flag' included in the PDU Session Establishment Request or Service Request message from the UE 3, then the S-NSSAI_2 incompatibility with the S-NSSAI_1 for difference in the SST values is over-written, i.e. the incompatibility is ignored. And the process proceeds to the next step 5).

5). Check for S-NSSAI_1 simultaneous use incompatibility with S-NSSAI_2—The AMF 11 determines whether the S-NSSAI_1 can be used simultaneously with the S-NSSAI_2, based on considering the value of at least one of the SST, the SD, and the network slice incompatibility attribute of at least one of the S-NSSAI_1 and the S-NSSAI_2. If the AMF 11 determines that the S-NSSAI_1 can be used simultaneously with the S-NSSAI_2, then the AMF 11 continues with the PDU session establishment procedure or Service Request on the S-NSSAI_2. Otherwise, if the AMF 11 determines that the S-NSSAI_1 cannot be used simultaneously with the S-NSSAI_2, then the AMF 11 rejects the PDU session establishment procedure or Service Request procedure on the S-NSSAI_2.

For example, in the case where the value of the network slice incompatibility attribute of the S-NSSAI_1 is 3, the S-NSSAI_1 cannot be used simultaneously with the S-NSSAI_2 regardless of the value of the SST, the SD, and the network slice incompatibility attribute of the S-NSSAI_2. In the case where the value of the network slice incompatibility attribute of the S-NSSAI_1 is 2, the S-NSSAI_1 can be used simultaneously with the S-NSSAI_2 if the value of the SD of the S-NSSAI_1 is same as the value of the SD of the S-NSSAI_2. In the case where the value of the network slice incompatibility attribute of the S-NSSAI_1 is 1, the S-NSSAI_1 can be used simultaneously with the S-NSSAI_2 if the value of the SST of the S-NSSAI_1 is same as the value of the SST of the S-NSSAI_2. In the case where the value of the network slice incompatibility attribute of the S-NSSAI_1 is 0, the S-NSSAI_1 can be used simultaneously with the S-NSSAI_2 regardless of the value of the SST, the SD, and the network slice incompatibility attribute of the S-NSSAI_2.

In case there are already active PDU sessions on more than one network slices, then the AMF 11 shall determine whether each one of these network slices can be used simultaneously with the S-NSSAI_2.

In this example, as there is an already active PDU session on the S-NSSAI_1 and since the value of the network slice incompatibility attribute of the S-NSSAI_1 is 2 (i.e. S-NSSAI_1 can be used simultaneously with the S-NSSAI_2 only if they have the same SD value) and as the value of the SD of the S-NSSAI_1 is same with SD value of the S-NSSAI_2, so the S-NSSAI_1 can be used simultaneously with the S-NSSAI_2. Thus the AMF 11 continues with the PDU session establishment procedure or Service Request procedure on the S-NSSAI_2.

If the process of step 3) in FIG. 13 is completed, the procedure proceeds to step 4) in FIG. 13.

4) The PDU Session Establishment procedure or Service Request on the S-NSSAI_2 continues as per 3GPP TS 23.502 [NPL 3].

In Aspect 1 of Solution 1 and Aspects 1 to 4 of Solution 2, the check for S-NSSAI_2 simultaneous use incompatibility with S-NSSAI_1 is performed before the check for S-NSSAI_1 simultaneous use incompatibility with S-NSSAI_2. Alternatively, the check for S-NSSAI_2 simultaneous use incompatibility with S-NSSAI_1 is performed after the check for S-NSSAI_1 simultaneous use incompatibility with S-NSSAI_2.

Further, in Aspect 1 of Solution 1 and Aspects 1 to 4 of Solution 2, the check for S-NSSAI_2 simultaneous use incompatibility with S-NSSAI_1 and the check for S-NSSAI_1 simultaneous use incompatibility with S-NSSAI_2 are described as being performed sequentially. Alternatively, these checks may be performed substantially at the same time. In other words, the UE 3 or the AMF 11 may determine whether the S-NSSAI_2 can be used simultaneously with the S-NSSAI_1 and the S-NSSAI_1 can be used simultaneously with the S-NSSAI_2, based on considering the value of the network slice incompatibility attribute of both of the S-NSSAI_1 and the S-NSSAI_2 and optionally the value of at least one of the SST, and the SD of both of the S-NSSAI_1 and the S-NSSAI_2. In this case, If the UE 3 or the AMF 11 determines that the S-NSSAI_2 can be used simultaneously with the S-NSSAI_1 and the S-NSSAI_1 can be used simultaneously with the S-NSSAI_2, then the UE 3 initiates a PDU session establishment procedure or Service Request on the S-NSSAI_2 or the AMF 11 continues with the PDU session establishment procedure on the S-NSSAI_2. Otherwise, if the UE 3 or the AMF 11 determines that the S-NSSAI_2 cannot be used simultaneously with the S-NSSAI_1 or the S-NSSAI_1 cannot be used simultaneously with the S-NSSAI_2, then the UE 3 does not initiate a PDU session establishment or Service Request procedure on the S-NSSAI_2 or the AMF 11 rejects the PDU session establishment procedure on the S-NSSAI_2.

In this case, after the check of for S-NSSAI_2 simultaneous use incompatibility with S-NSSAI_1 and the check for S-NSSAI_1 simultaneous use incompatibility with S-NSSAI_2, the UE 3 or the AMF 11 may check "replace_flag" (in the case of Aspect 3 in Solution 2) or "overwrite_flag" (in the case of Aspect 4 in Solution 2).

<Summary>

Beneficially, the above described aspects include, although they are not limited to, one or more of the following functionalities:

- New Network Slice usage Incompatibility attribute in the UE subscription information in the UDM 12.
- New Network Slice usage Incompatibility attribute parameter in the Registration Accept and UE Configuration Update messages.
- New Network Slice usage Incompatibility support indication in the Registration Request message and on the AMF/UDM Interface.
- New over-write flag in the PDU Session Establishment Request and Service Request messages.
- New Network Slice Incompatibility reject cause parameter in PDU Session Establishment Reject and Service Reject messages.
- New UE behaviour and new network behaviour for Network Slices usage Incompatibility management/enforcement to allow for network slice isolation so that 5G security and integrity are not compromised, e.g.:
  Sensitive data managed inside a network slice could be exposed to applications running on other network slices;
  Isolation between multiple network operators;
  Resource isolation between different network slices.

<Benefits>

The present disclosure proposes various methods for control and enforcement of the constraints for simultaneous usage of certain network slices in the UE 3 and in the network. This allows for different level of isolation between the network slices leading to improved 5G security and integrity in the data exchange between certain network slices.

<System Overview>

Figure 16:
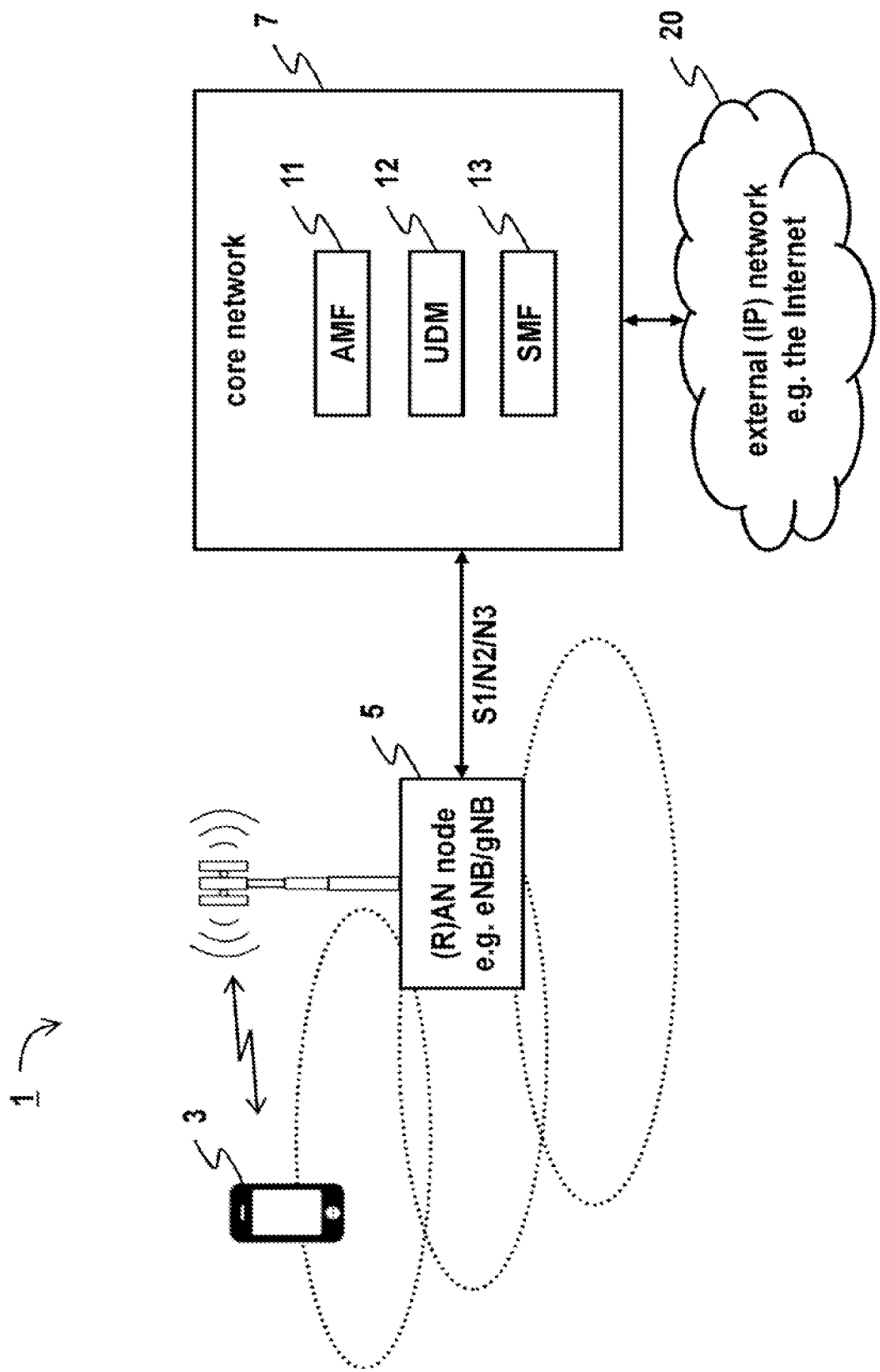
FIG. 16 schematically illustrates a mobile (cellular or wireless) telecommunication system 1 to which the above aspects are applicable.

FIG. 16 schematically illustrates a mobile (cellular or wireless) telecommunication system 1 to which the above aspects are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 (RAN node) are shown in FIG. 16 for illustration purposes, the system, when implemented, will typically include other base stations and mobile devices 3 (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) and user plane functions (UPFs). It will be appreciated that the core network 7 may also include, amongst others: an Access and Mobility Management Function (AMF) 11, a Unified Data Management (UDM) function 12, and a Session Management Function (SMF) 13. Although not shown in FIG. 16, the core network 7 may also be coupled to at least one application function (AF)/application server (AS). From the core network 7, connection to an external IP network/data network 20 (such as the Internet) is also provided.

The components of this system 1 are configured to perform one or more of the above described aspects.

<User Equipment (UE)>

Figure 17:
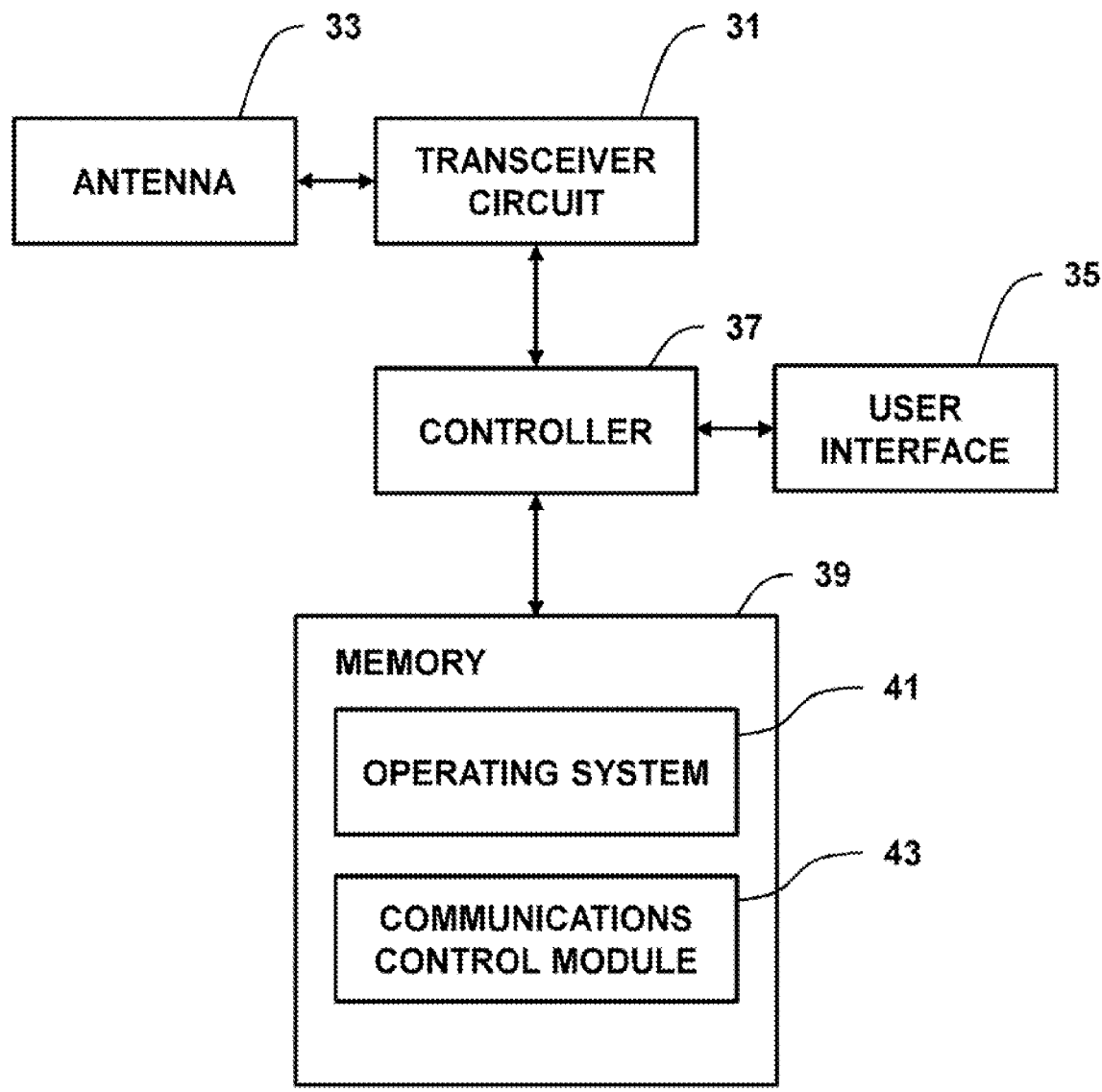
FIG. 17 is a block diagram illustrating the main components of the UE (mobile device 3) shown in FIG. 16.

FIG. 17 is a block diagram illustrating the main components of the UE (mobile device 3) shown in FIG. 16. As shown, the UE 3 includes a transceiver circuit 31 which is operable to transmit signals to and to receive signals from the connected node(s) via one or more antenna 33. Although not necessarily shown in FIG. 17, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5, application functions, and core network nodes. Such signaling includes appropriately formatted requests and responses relating to network slice quota management.

<(R)AN Node>

Figure 18:
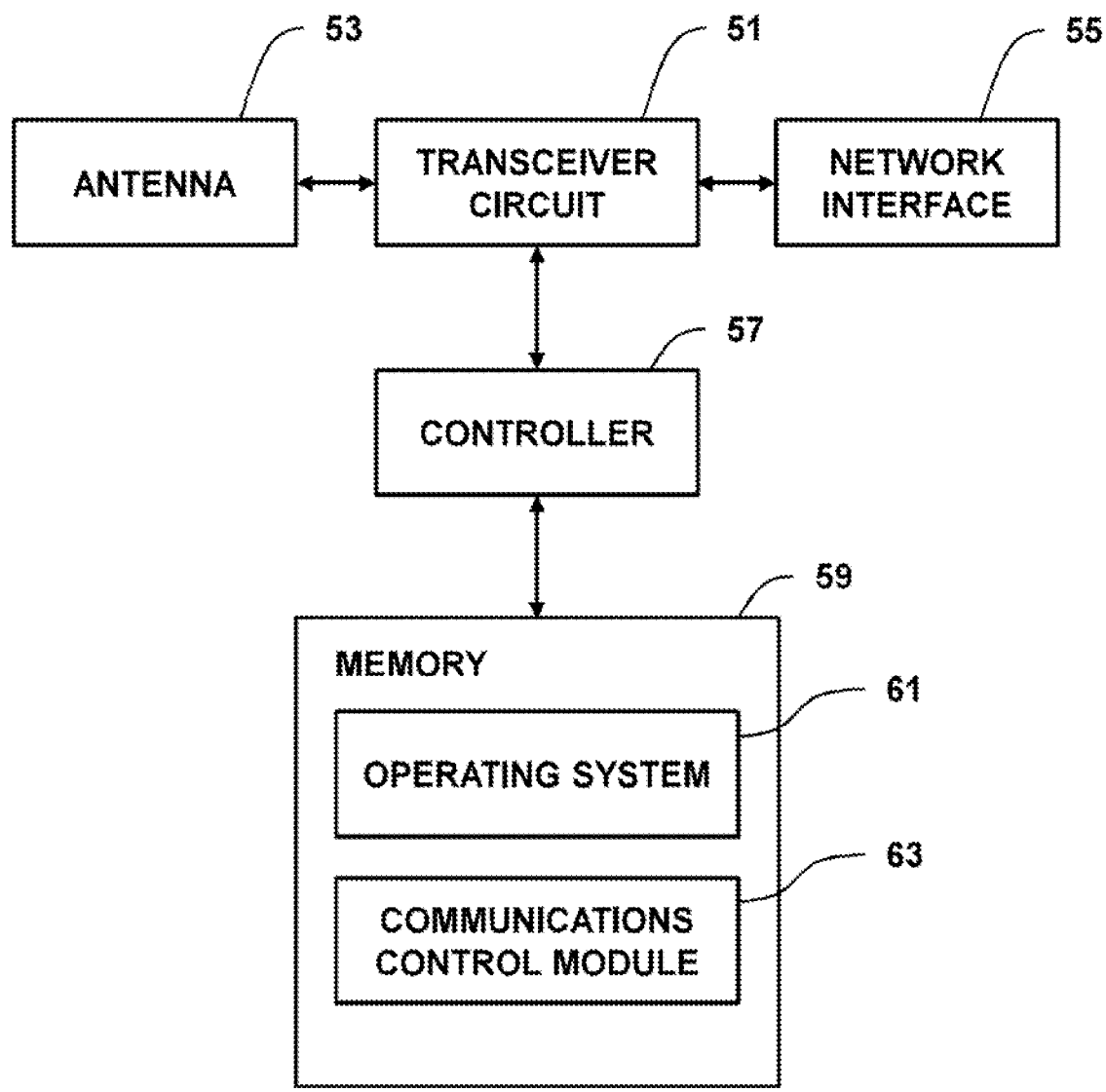
FIG. 18 is a block diagram illustrating the main components of an exemplary (R)AN node 5 (base station) shown in FIG. 16.

FIG. 18 is a block diagram illustrating the main components of an exemplary (R)AN node 5 (base station) shown in FIG. 16. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3, and the core network nodes. Such signaling includes appropriately formatted requests and responses relating to network slice quota management.

<Core Network Node>

Figure 19:
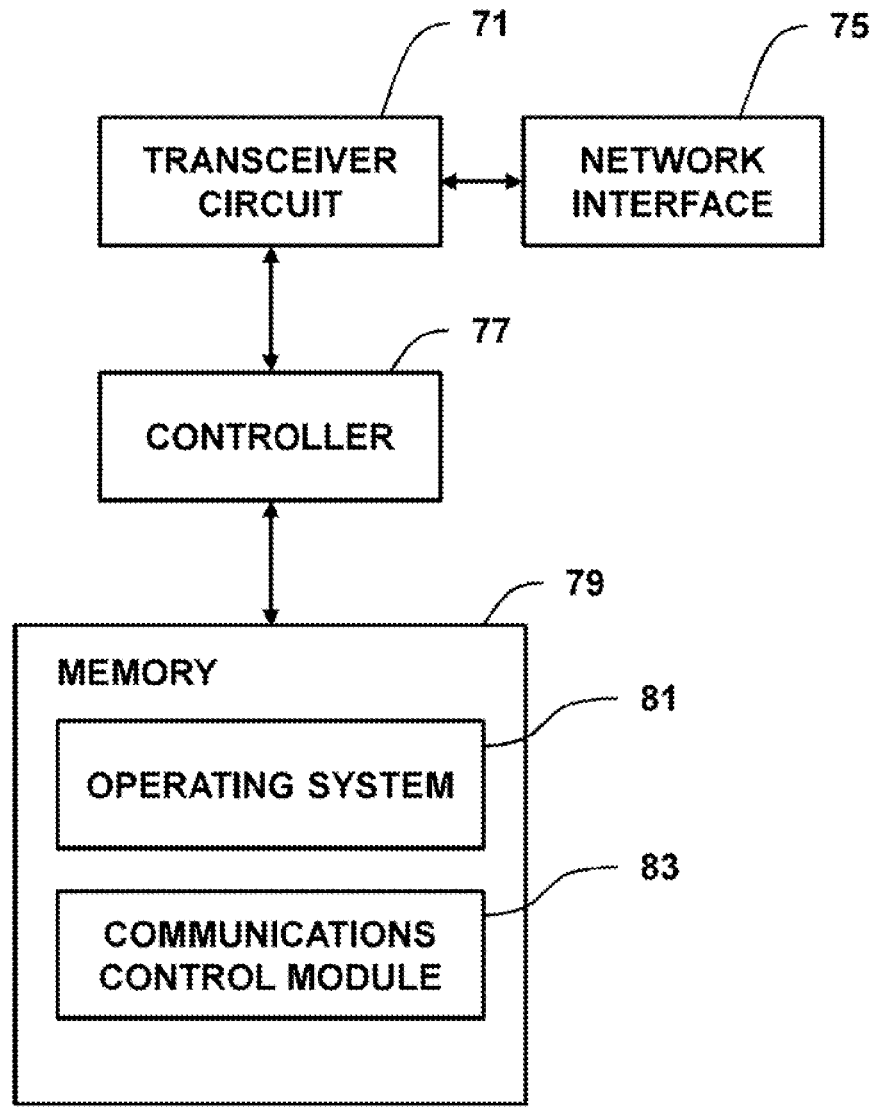
FIG. 19 is a block diagram illustrating the main components of a generic core network node (or function) shown in FIG. 16.

FIG. 19 is a block diagram illustrating the main components of a generic core network node (or function) shown in FIG. 16, for example, the AMF 11, the UDM 12, and the SMF 13. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted requests and responses relating to network slice quota management.

<Modifications and Alternatives>

Detailed aspects have been described above. As those skilled in the art will appreciate, a number of modifications and alternatives can be made to the above aspects whilst still benefiting from the inventions embodied therein. By way of illustration only a number of these alternatives and modifications will now be described.

In the above description, the UE 3, the (R)AN node 5, and the core network node are described for ease of understanding as having a number of discrete modules (such as the communication control modules). Whilst these modules may be provided in this way for certain applications, for example where an existing system has been modified to implement the above aspects, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or uncompiled form and may be supplied to the UE 3, the (R)AN node 5, and the core network node as a signal over a computer network, or on a recording medium. Further, the functionality performed by part or all of this software may be performed using one or more dedicated hardware circuits. However, the use of software modules is preferred as it facilitates the updating of the UE 3, the (R)AN node 5, and the core network node in order to update their functionalities.

The above aspects are also applicable to 'non-mobile' or generally stationary user equipment.

Various other modifications will be apparent to those skilled in the art and will not be described in further detail here.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

Although the present invention has been described with reference to the exemplary embodiments, the present invention is not limited to the above. Various changes that can be understood by those skilled in the art can be made to the configuration and details of the present invention within the scope of the invention.

For example, the whole or part of the exemplary embodiments disclosed above can be described as, but not limited to, the following supplementary notes.

(Supplementary Note 1)
A user equipment (UE), comprising:
means for determining whether a new Protocol Data Unit (PDU) session is compatible or incompatible with an established PDU session based on all of:
a) at least one of a value of a first Slice Service Type (SST) of a first Single-Network Slice Selection Assistance Information (S-NSSAI) for the established PDU session on the UE and a value of a first Service Descriptor (SD) of the first S-NSSAI for the established PDU session on the UE,
b) a first incompatibility attribute value for indicating restriction of at least one of the value of the first SST and the value of the first SD for simultaneous use of the new PDU session and the established PDU session,
c) at least one of a value of a second SST of a second S-NSSAI for the new PDU session and a value of a second SD of the second S-NSSAI, and
d) a second incompatibility attribute value for indicating restriction of at least one of the value of the second SST and the value of the second SD for simultaneous use of the new PDU session and the established PDU session.

(Supplementary Note 2)
The UE according to Supplementary note 1, further comprising:
means for receiving an incompatibility attribute value for indicating restriction of at least one of a value of a SST and a value of a SD per S-NSSAI in a Registration Accept message, from a core network node for mobility management.

(Supplementary Note 3)
The UE according to Supplementary note 2, wherein
the means for receiving is configured to receive the incompatibility attribute value per S-NSSAI in a case where the UE sends capability information for indicating that the UE is configured to understand the Attribute value per 5-NSSAI.

(Supplementary Note 4)
The UE according to any one of Supplementary notes 1 to 3, wherein
each incompatibility attribute value of the first incompatibility attribute value, the second incompatibility attribute value and the incompatibility attribute value includes at least one of:
a) a value indicating that a network slice associated to the each incompatibility attribute value can be used simultaneously with any network slice,
b) a value indicating that a network slice associated to the each incompatibility attribute value can be used simultaneously with any network slice with a same value of a SST,
c) a value indicating that a network slice associated to the each incompatibility attribute value can be used simultaneously with any network slice with a same value of a SD, and
d) a value indicating that a network slice associated to the each incompatibility attribute value cannot be used simultaneously with any network slice.

(Supplementary Note 5)
The UE according to any one of Supplementary notes 1 to 4, wherein
each incompatibility attribute value of the first incompatibility attribute value, the second incompatibility attribute value and the incompatibility attribute value is included in subscription information in a Network Function node for subscription information or configuration information for the UE.

(Supplementary Note 6)
The UE according to Supplementary note 2, further comprising:
means for sending an indication to indicate support for a feature of determining incompatibility with the new PDU session and the established PDU session, in a Registration Request message, to the core network node for mobility management.

(Supplementary Note 7)
The UE according to Supplementary note 1, further comprising:
means for receiving a cause for indicating incompatibility with the new PDU session and the established PDU session in at least one of a PDU session establishment reject message and a Service Reject message, from a core network node for mobility management.

(Supplementary Note 8)
The UE according to Supplementary note 1, further comprising:
means for receiving a rejection cause for indicating incompatibility with other network slices per rejected S-NSSAI in a Registration Accept message, from a core network node for mobility management.

(Supplementary Note 9)
A core network node for mobility management, comprising:
means for receiving, from a user equipment (UE), a message for using a new Protocol Data Unit (PDU) session, the message including a second Single-Network Slice Selection Assistance Information (S-NSSAI) for the new PDU session on the UE and a second incompatibility attribute value for indicating restriction of at least one of a value of a second Slice Service Type (SST) of the second S-NSSAI and a value of a second Service Descriptor (SD) of the second S-NSSAI for simultaneous use of the new PDU session and an established PDU session; and means for determining whether the new PDU session is compatible or incompatible with the established PDU session based on all of:

a) at least one of a value of a first SST of a first S-NSSAI for the established PDU session on the UE and a value of a first SD of the first S-NSSAI, b) a first incompatibility attribute value for indicating restriction of at least one of the value of the first SST and the value of the first SD for simultaneous use of the new PDU session and the established PDU session, c) at least one of the value of the second SST and the value of the second SD, and d) the second incompatibility attribute value for indicating restriction of the at least one of the value of the second SST and the value of the second SD for simultaneous use of the new PDU session and the established PDU session.

(Supplementary Note 10)

The core network node according to Supplementary note 9, wherein each incompatibility attribute value of the first incompatibility attribute value, the second incompatibility attribute value and the incompatibility attribute value includes at least one of:

a) a value indicating that a network slice associated to the each incompatibility attribute value can be used simultaneously with any network slice, b) a value indicating that a network slice associated to the each incompatibility attribute value can be used simultaneously with any network slice with a same value of a SST, c) a value indicating that a network slice associated to the each incompatibility attribute value can be used simultaneously with any network slice with a same value of a SD, and d) a value indicating that a network slice associated to the each incompatibility attribute value cannot be used simultaneously with any network slice.

(Supplementary Note 11)

The core network node according to Supplementary note 9 or 10, wherein the means for receiving is configured to receive the message including a replace flag, and the core network node further comprises:

means for releasing the established PDU session in a case where the message includes the replace flag and the means for determining determines that the new PDU session cannot be established; and means for establishing the new PDU session in a case where the message includes the replace flag and the means for determining determines that the new PDU session cannot be established.

(Supplementary Note 12)

The core network node according to Supplementary note 11, wherein the means for releasing is configured to release the established PDU session in a case where the means for determining determines that the new PDU session cannot be established due to incompatibility with the value of the SST, and the means for establishing is configured to establish the new PDU session in a case where the means for determining determines that the new PDU session cannot be established due to incompatibility with the value of the SST.

(Supplementary Note 13)

The core network node according to Supplementary note 11, wherein the means for releasing is configured to release the established PDU session in a case where the means for determining determines that the new PDU session cannot be established due to incompatibility with the value of the SD, and the means for establishing is configured to establish the new PDU session in a case where the means for determining determines that the new PDU session cannot be established due to incompatibility with the value of the SD.

(Supplementary Note 14)

The core network node according to Supplementary note 9 or 10, wherein the means for receiving is configured to receive the message including an overwrite flag, and the core network node further comprises:

means for maintaining the established PDU session in a case where the message includes the overwrite flag and the means for determining determines that the new PDU session cannot be established; and means for establishing the new PDU session in a case where the message includes the overwrite flag and the means for determining determines that the new PDU session cannot be established.

(Supplementary Note 15)

The core network node according to Supplementary note 14, wherein the means for maintaining is configured to maintain the established PDU session in a case where the means for determining determines that the new PDU session cannot be established due to incompatibility with the value of the SST, and the means for establishing is configured to establish the new PDU session in a case where the means for determining determines that the new PDU session cannot be established due to incompatibility with the value of the SST.

(Supplementary Note 16)

The core network node according to Supplementary note 14, wherein the means for maintaining is configured to maintain the established PDU session in a case where the means for determining determines that the new PDU session cannot be established due to incompatibility with the value of the SD, and the means for establishing is configured to establish the new PDU session in a case where the means for determining determines that the new PDU session cannot be established due to incompatibility with the value of the SD.

(Supplementary Note 17)

The core network node according to any one of Supplementary notes 9 to 16, wherein each incompatibility attribute value of the first incompatibility attribute value, the second incompatibility attribute value and the incompatibility attribute value is included in subscription information in a Network Function node for subscription information or configuration information for the UE.

(Supplementary Note 18)
The core network node according to Supplementary note 9, further comprising:
means for receiving an indication to indicate support for a feature of determining incompatibility with the new PDU session and the established PDU session, in a Registration Request message from the UE.

(Supplementary Note 19)
The core network node according to Supplementary note 9, further comprising:
means for sending a cause for indicating incompatibility with the new PDU session and the established PDU session in at least one of a PDU session establishment reject message and a Service Reject message, to the UE.

(Supplementary Note 20)
The core network node according to Supplementary note 9, further comprising:
means for sending a rejection cause for indicating incompatibility with other network slices per rejected S-NSSAI in a Registration Accept message, to the UE.

(Supplementary Note 21)
A controlling method for a user equipment (UE), the controlling method comprising:
determining whether a new Protocol Data Unit (PDU) session is compatible or incompatible with an established PDU session based on all of:
a) at least one of a value of a first Slice Service Type (SST) of a first Single-Network Slice Selection Assistance Information (S-NSSAI) for the established PDU session on the UE and a value of a first Service Descriptor (SD) of the first S-NSSAI for the established PDU session on the UE,
b) a first incompatibility attribute value for indicating restriction of at least one of the value of the first SST and the value of the first SD for simultaneous use of the new PDU session and the established PDU session,
c) at least one of a value of a second SST of a second S-NSSAI for the new PDU session and a value of a second SD of the second S-NSSAI, and
d) a second incompatibility attribute value for indicating restriction of at least one of the value of the second SST and the value of the second SD for simultaneous use of the new PDU session and the established PDU session.

(Supplementary Note 22)
A controlling method for a core network node for mobility management, the controlling method comprising:
receiving, from a user equipment (UE), a message for using a new Protocol Data Unit (PDU) session, the message including a second Single-Network Slice Selection Assistance Information (S-NSSAI) for the new PDU session on the UE and a second incompatibility attribute value for indicating restriction of at least one of a value of a second Slice Service Type (SST) of the second S-NSSAI and a value of a second Service Descriptor (SD) of the second S-NSSAI for simultaneous use of the new PDU session and an established PDU session; and
determining whether the new PDU session is compatible or incompatible with the established PDU session based on all of:
a) at least one of a value of a first SST of a first S-NSSAI for the established PDU session on the UE and a value of a first SD of the first S-NSSAI,
b) a first incompatibility attribute value for indicating restriction of at least one of the value of the first SST and the value of the first SD for simultaneous use of the new PDU session and the established PDU session,
c) at least one of the value of the second SST and the value of the second SD, and
d) the second incompatibility attribute value for indicating restriction of the at least one of the value of the second SST and the value of the second SD for simultaneous use of the new PDU session and the established PDU session.

This application is based upon and claims the benefit of priority from European provisional patent application No. EP20173543.8, filed on May 7, 2020, the disclosure of which is incorporated herein in its entirety by reference.

REFERENCE SIGNS LIST

1 System
3 Mobile device, UE
5 (R)AN node, Base station
7 Core network
11 AMF
12 UDM
13 SMF
20 External IP network
31 Transceiver circuit
33 Antenna
35 User interface
37 Controller
39 Memory
41 Operating system
43 Communications control module
51 Transceiver circuit
53 Antenna
55 Network interface
57 Controller
59 Memory
61 Operating system
63 Communications control module
71 Transceiver circuit
75 Network interface
77 Controller
79 Memory
81 Operating system
83 Communications control module

The invention claimed is:

1. A method for a user equipment (UE), the method comprising:
sending a Registration Request message, to a core network node for mobility management, the Registration Request message including a requested Network Slice Selection Assistance Information (NSSAI) and an indication, the indication indicating that the UE supports restrictions to simultaneous registration of network slices feature; and
receiving a Registration Accept message, from the core network node for mobility management, the Registration Accept message including information constraining which Single Network Slice Selection Assistance Information (S-NSSAI) can be simultaneously provided in an Allowed NSSAI,
wherein the receiving comprises receiving, in a case where the Requested NSSAI in the Registration Request message includes an S-NSSAI and another S-NSSAI that cannot be simultaneously used with each other, information related to an updated definition for the S-NSSAI.

2. The method according to claim 1, wherein
the information related to restriction is received in response to sending the indication.

3. The method according to claim 2, wherein
the information related to restriction is received in a case where second information related to restriction which network slices are simultaneously provided is associated with each Single Network Slice Selection Assistance Information (S-NSSAI) in subscription information.

4. The method according to claim 1, further comprising:
receiving a cause for indicating incompatibility with new Protocol Data Unit (PDU) session and established PDU session in at least one of a PDU session establishment reject message and a Service Reject message, from the core network node for mobility management.

5. The method according to claim 1, further comprising:
receiving a rejection cause for indicating incompatibility with other network slices per rejected S-NSSAI in the Registration Accept message, from the core network node for mobility management.

6. A method for a core network node for mobility management, the method comprising:
receiving, from a user equipment (UE), a Registration Request message, the Registration Request message including a requested Network Slice Selection Assistance Information (NSSAI) and an indication, the indication indicating that the UE supports restrictions to simultaneous registration of network slices feature; and
sending, to the UE, a Registration Accept message, the Registration Accept message including information constraining which Single Network Slice Selection Assistance Information (S-NSSAI) can be simultaneously provided in an Allowed NSSAI,
wherein the sending comprises sending, in a case where the Requested NSSAI in the Registration Request message includes an S-NSSAI and another S-NSSAI that cannot be simultaneously used with each other, information related to an updated definition for the S-NSSAI.

7. The method according to claim 6, wherein
the information related to restriction is sent in response to receiving the indication.

8. The method according to claim 7, wherein
the information related to restriction is sent in a case where second information related to restriction which network slices are simultaneously provided is associated with each Single Network Slice Selection Assistance Information (S-NSSAI) in subscription information.

9. The method according to claim 6, further comprising:
sending, to the UE, a cause for indicating incompatibility with new Protocol Data Unit (PDU) session and established PDU session in at least one of a PDU session establishment reject message and a Service Reject message.

10. The method according to claim 6, further comprising:
sending, to the UE, a rejection cause for indicating incompatibility with other network slices per rejected S-NSSAI in the Registration Accept message.

11. A user equipment (UE), comprising:
a memory storing instructions; and
at least one hardware processor configured to process the instructions to:
send a Registration Request message, to a core network node for mobility management, the Registration Request message including a requested Network Slice Selection Assistance Information (NSSAI) and an indication, the indication indicating that the UE supports restrictions to simultaneous registration of network slices feature; and
receive a Registration Accept message, from the core network node for mobility management, the Registration Accept message including information constraining which Single Network Slice Selection Assistance Information (S-NSSAI) can be simultaneously provided in an Allowed NSSAI,
wherein the at least one hardware processor is further configured to process the instructions to receive, in a case where the Requested NSSAI in the Registration Request message includes an S-NSSAI and another S-NSSAI that cannot be simultaneously used with each other, information related to an updated definition for the S-NSSAI.

12. A core network node for mobility management, comprising:
a memory storing instructions; and
at least one hardware processor configured to process the instructions to:
receive, from a user equipment (UE), a Registration Request message, the Registration Request message including a requested Network Slice Selection Assistance Information (NSSAI) and an indication, the indication indicating that the UE supports restrictions to simultaneous registration of network slices feature; and
send, to the UE, a Registration Accept message, the Registration Accept message including information constraining which Single Network Slice Selection Assistance Information (S-NSSAI) can be simultaneously provided in an Allowed NSSAI,
wherein the at least one hardware processor is further configured to process the instructions to send, in a case where the Requested NSSAI in the Registration Request message includes an S-NSSAI and another S-NSSAI that cannot be simultaneously used with each other, information related to an updated definition of the S-NSSAI.

* * * * *